US010331141B2

(12) United States Patent
Grimm et al.

(10) Patent No.: US 10,331,141 B2
(45) Date of Patent: Jun. 25, 2019

(54) SYSTEMS FOR AUTONOMOUS VEHICLE ROUTE SELECTION AND EXECUTION

(71) Applicant: GM Global Technology Operations LLC, Detroit, MI (US)

(72) Inventors: Donald K. Grimm, Utica, MI (US); Fan Bai, Ann Arbor, MI (US); Jenne-tai Wang, Rochester, MI (US); Bing Deng, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 429 days.

(21) Appl. No.: 15/198,688

(22) Filed: Jun. 30, 2016

(65) Prior Publication Data
US 2018/0004211 A1    Jan. 4, 2018

(51) Int. Cl.
*G01C 17/00* (2006.01)
*G05D 1/02* (2006.01)
(Continued)

(52) U.S. Cl.
CPC ....... *G05D 1/0214* (2013.01); *G01C 21/3407* (2013.01); *G01C 21/3461* (2013.01);
(Continued)

(58) Field of Classification Search
CPC .............. G05D 1/0214; G05D 1/0066; G01C 21/3407; G01C 21/3461
See application file for complete search history.

(56) References Cited

U.S. PATENT DOCUMENTS

2003/0074471 A1* 4/2003 Anderson ......... H04L 29/12009
709/245
2009/0240427 A1* 9/2009 Siereveld ........... G01C 21/3469
701/533
2018/0005525 A1* 1/2018 Parundekar ......... G08G 1/0967

OTHER PUBLICATIONS

Sarah Shelton, "Berkeley Study: Driverless Taxis Maximize Benefits of Autonomous EVs", hybridCARS, Jul. 7, 2015, pp. 1-5.
(Continued)

*Primary Examiner* — Adam M Alharbi
(74) *Attorney, Agent, or Firm* — Parks IP Law LLC

(57) ABSTRACT

A system for determining and executing an autonomous-vehicle vehicle travel route, including a hardware-based processing unit and a non-transitory computer-readable storage medium. The storage medium includes an input-interface module that, when executed by the hardware-based processing unit, obtains factor data indicating factors relevant to determining a vehicle travel route. The storage medium also includes a route-generation module comprising a route-complexity sub-module. The route-complexity sub-module determines, based on the factor data, route-complexity indexes corresponding to respective optional routes. The route-generation module determines the vehicle travel route based on the route-complexity indexes. The storage in various embodiments includes other sub-modules associated with other elements, such as autonomous-driving safety, comfort, stress, pollution, scenery, or infrastructure-accessibility, for determining and executing an autonomous-driving travel route. In some embodiments, the storage includes an autonomous-driving perceptions module and an autonomous-driving control module for modifying vehicle functions in executing the autonomous-driving travel route.

15 Claims, 5 Drawing Sheets

(51) Int. Cl.
*G01C 21/34* (2006.01)
*G05D 1/00* (2006.01)
*G06Q 10/08* (2012.01)
*G06Q 10/04* (2012.01)
*G06Q 50/28* (2012.01)

(52) U.S. Cl.
CPC ......... *G05D 1/0066* (2013.01); *G05D 1/0088* (2013.01); *G06Q 10/047* (2013.01); *G06Q 10/08355* (2013.01); *G06Q 50/28* (2013.01); *G05D 2201/0212* (2013.01)

(56) References Cited

OTHER PUBLICATIONS

"Torger Miller: Routing an Autonomous Car for Signal Strength", CAT Vehicle, The University of Arizona, pp. 1-3.

\* cited by examiner

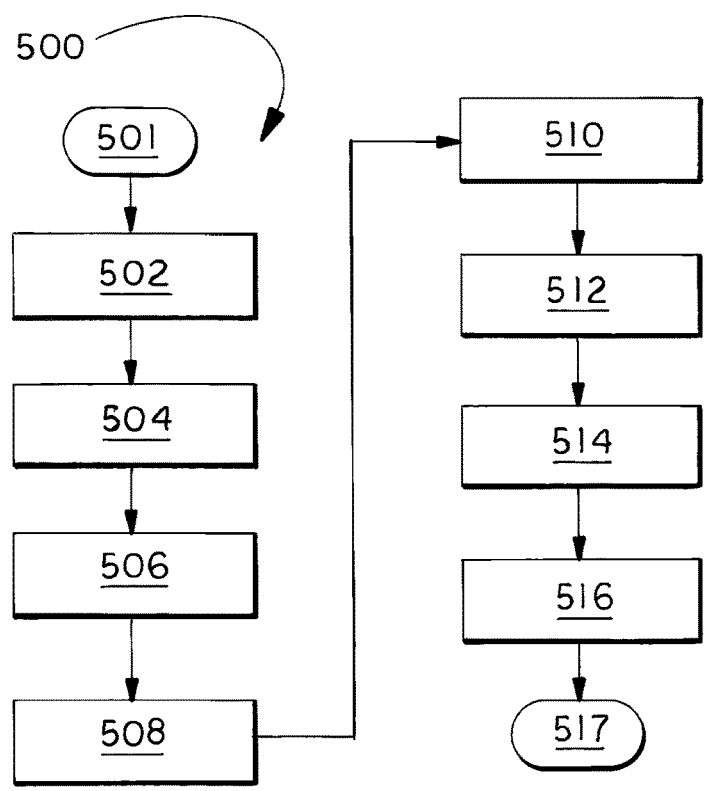
Fig_5
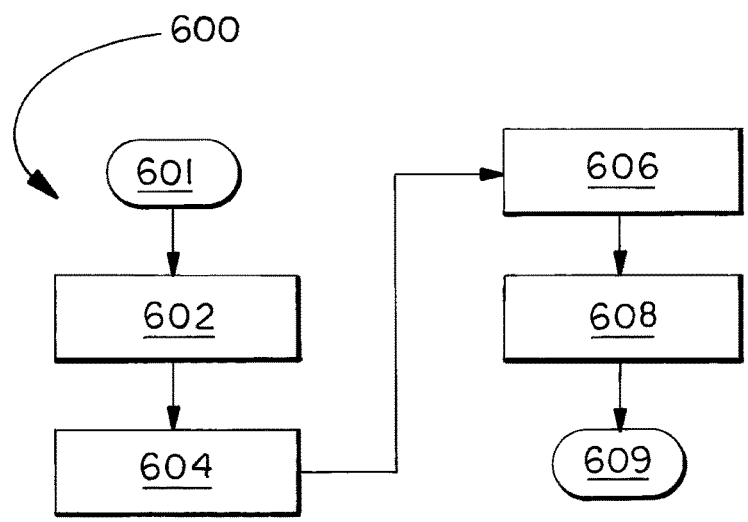
Fig_6

SYSTEMS FOR AUTONOMOUS VEHICLE ROUTE SELECTION AND EXECUTION

TECHNICAL FIELD

The present disclosure relates generally to autonomous-vehicle navigation and, more particularly, to systems for determining, and in some embodiments executing, routes for autonomous vehicles based on any of various elements, other than economy, time-to-arrival, distance-to-arrival, and highway-vs-non-highway driving. Example elements include route complexity, or likelihood of required interventions, passenger comfort, autonomous-vehicle passenger safety, and extra-vehicle infrastructure accessibility.

BACKGROUND

This section provides background information related to the present disclosure which is not necessarily prior art.

Manufacturers are increasingly producing vehicles having higher levels of driving automation. Features such as adaptive cruise control and lateral positioning have become popular and are precursors to greater adoption of fully autonomous-driving-capable vehicles.

While availability of autonomous-driving-capable vehicles is on the rise, users' familiarity and comfort with autonomous-driving functions will not necessarily keep pace. User comfort with the automation is an important aspect in overall technology adoption and user experience.

Also, with highly automated vehicles expected to be commonplace in the near future, a market for fully-autonomous taxi services and shared vehicles is developing.

Uneasiness with automated-driving functionality, and possibly also with the shared-vehicle experience, can lead to reduced use of the autonomous driving capabilities, such as by the user not engaging, or disengaging, autonomous-driving operation, or not commencing or continuing in a shared-vehicle ride. In some cases, the user continues to use the autonomous functions, whether in a shared vehicle, but with a relatively low level of satisfaction.

An uncomfortable user may also be less likely to order or use a fully-autonomous vehicle experience in the first place, or to learn about and use more-advanced autonomous-driving capabilities, whether in a shared ride.

Levels of adoption can also affect marketing and sales of autonomous-driving-capable vehicles. As users' trust in autonomous-driving systems and shared-automated vehicles increases, the users are more likely to purchase an autonomous-driving-capable vehicle, schedule an automated taxi, share an automated vehicle, model doing the same for others, or expressly recommend that others do the same.

SUMMARY

In one aspect, the present technology relates to system for determining and executing an autonomous-vehicle vehicle travel route, including a hardware-based processing unit and a non-transitory computer-readable storage medium.

The storage medium includes an input-interface module that, when executed by the hardware-based processing unit, obtains factor data indicating factors relevant to determining a vehicle travel route.

The storage medium also includes a route-generation module comprising a route-complexity sub-module. The route-complexity sub-module determines, based on the factor data, route-complexity indexes corresponding to respective optional routes.

The route-generation module determines the vehicle travel route based on the route-complexity indexes.

The storage medium in various embodiments, instead or also, includes one or more other sub-modules associated with other elements, such as autonomous-driving safety, comfort, pollution, scenery, driver stress level, or infrastructure-accessibility, for determining and executing routes.

In various embodiments, the storage medium includes an autonomous-driving perceptions module and an autonomous-driving control module for modifying a vehicle-perception system and vehicle-control functions, respectively, in executing the route.

The system is various embodiments implemented at an autonomous-driving-capable vehicle; the system further comprises autonomous-driving apparatus; and the storage medium further comprises a route-execution module that, when executed by the hardware-based processing unit, controls the autonomous-driving apparatus to control the vehicle for executing the vehicle travel route determined.

In various implementations, the indexes are autonomous-driving route-complexity indexes; the vehicle travel route is an autonomous-driving route determined to be executed in autonomous driving of the autonomous-driving-capable vehicle; and the route-generation module, in determining the vehicle travel route, determines the vehicle travel route based on the one or more automated-driving route-complexity indexes. The route-complexity sub-module, in determining the route-complexity indexes, could determine the indexes, for each of the respective optional routes, based on (a) an estimated likelihood that one or more vehicle-to-passenger control interventions will be performed in execution of the route, based on the factor data or (b) an estimated number of interventions that will be performed in execution of the route, based on the factor data.

In embodiments, the route-generation module includes a route-comfort sub-module; the route-comfort sub-module, when executed by the hardware-based processing unit, determines, based on the factor data, one or more route-comfort indexes corresponding to the respective optional routes; and the route-generation module, when executed by the hardware-based processing unit, determines the vehicle travel route based on the route-comfort indexes and the route-complexity indexes. And determining each of the route-comfort indexes can be based on a level of comfort, a level of discomfort, and/or a level of human stress level expected in execution of a corresponding route of the optional routes.

In various embodiments, the route-generation module comprises an autonomous-driving route-safety sub-module; the autonomous-driving route-safety sub-module, when executed by the hardware-based processing unit, determines, based on the factor data, one or more autonomous-driving route-safety indexes corresponding to the respective optional routes; and the route-generation module, when executed by the hardware-based processing unit, determines the vehicle travel route based on the autonomous-driving route-safety indexes and the route-complexity indexes. And the autonomous-driving route-safety sub-module, in determining the autonomous-driving route-safety index for each of the optional routes, may determine the autonomous-driving route-safety index based on (i) an estimated frequency of safety incidents that occurred in the past on the route; (ii) an estimated number of safety incidents that occurred in the past on execution of the route; or (iii) an estimated severity of safety incidents that occurred in the past on execution of the route.

In embodiments, the system is implemented in an autonomous-driving-capable vehicle; the vehicle travel route is an autonomous vehicle travel route determined to be executed in autonomous driving of the autonomous-driving-capable vehicle; and at least one of the safety incidents relates to (A) a risk of injury or wear and tear to an autonomous-vehicle to execute the autonomous vehicle travel route, or (B) a risk of injury to a passenger of the automated vehicle when the autonomous vehicle travel route is executed by the autonomous-driving-capable vehicle.

In various embodiments, the route-generation module comprises a route-pollution sub-module; the route-pollution sub-module, when executed by the hardware-based processing unit, determines, based on the factor data, one or more route-pollution indexes corresponding to the respective optional routes; and the route-generation module, when executed by the hardware-based processing unit, determines the vehicle travel route based on the route-pollution indexes and the route-complexity indexes. And the route-pollution index determined for each of the optional routes, having different levels of pollution exposure: relates to sound pollution, air pollution, or noise pollution expected in execution of the route; or is based on a severity of pollution expected in execution of the route.

In various implementations, the route-generation module includes a route-infrastructure-accessibility sub-module; the route-infrastructure-accessibility sub-module, when executed by the hardware-based processing unit, determines, based on the factor data, one or more route-infrastructure-accessibility indexes corresponding to the respective optional routes; and the route-generation module, when executed by the hardware-based processing unit, determines the vehicle travel route based on the route-infrastructure-accessibility indexes and the route-complexity indexes.

In various embodiments, the route-generation module in embodiments includes route-scene sub-module; the route-scene sub-module, when executed by the hardware-based processing unit, determines, based on the factor data, one or more route-scene indexes corresponding to the respective optional routes; and the route-generation module, when executed by the hardware-based processing unit, determines the vehicle travel route based on the route-scene indexes and the route-complexity indexes.

In various embodiments, the system is implemented in an autonomous-driving-capable vehicle; the vehicle travel route is an autonomous vehicle travel route determined to be executed in autonomous driving of the autonomous-driving-capable vehicle; and the non-transitory computer-readable storage medium further comprises an autonomous-vehicle perception sub-module that, when executed by the hardware-based processing unit, determines an adjustment to make to a perception system of the autonomous-driving-capable vehicle for adjusting perception-system function in execution of the autonomous vehicle travel route determined.

The system is in embodiments implemented in an autonomous-driving-capable vehicle; the vehicle travel route is an autonomous vehicle travel route determined to be executed in autonomous driving of the autonomous-driving-capable vehicle; and the non-transitory computer-readable storage medium further comprises an autonomous-driving control sub-module that, when executed by the hardware-based processing unit, determines a modification to make to an autonomous driving system of the autonomous-driving-capable vehicle for modified execution of the vehicle travel route determined, differing from an unmodified manner of executing the autonomous vehicle travel route.

Other aspects of the present technology will be in part apparent and in part pointed out hereinafter.

DESCRIPTION OF THE DRAWINGS

FIG. 5 shows a first exemplary flow for determining a route for execution at a non-vehicle navigation apparatus, according to embodiments of the present technology.

FIG. 6 shows a second exemplary flow for determining a route for execution at a vehicle-embedded navigation apparatus, according to other embodiments of the present technology.

Figure 1:
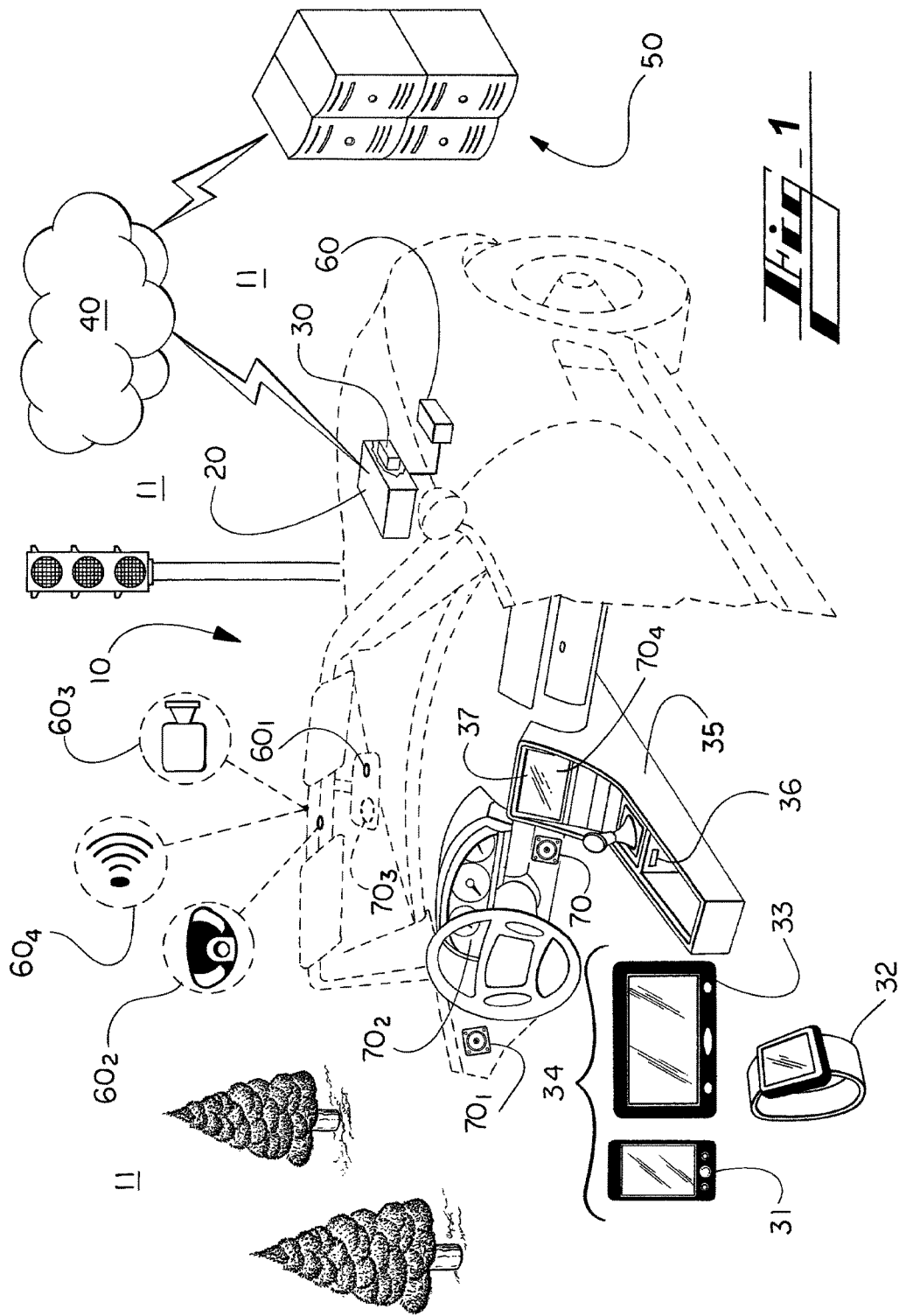
FIG. 1 illustrates schematically an example vehicle of transportation, with local and remote computing devices, according to embodiments of the present technology.

The figures are not necessarily to scale and some features may be exaggerated or minimized, such as to show details of particular components.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, and similar terms, refer expansively to embodiments that serve as an illustration, specimen, model or pattern.

In some instances, well-known components, systems, materials or processes have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Technology Introduction

The present disclosure describes, by various embodiments, systems, processes, and algorithms for determining routes for autonomous vehicles.

The system in various embodiments executes the routes and in some implementations adjusts a vehicle perception system and/or a vehicle autonomous-driving system for affecting a manner in which a pre-selected route is followed.

Functions are performed based on elements besides, or along with, time-to-arrival, distance-to-arrival, highway-vs.-non-highway driving, route fuel efficiency, and/or route eco-friendly metrics. Example elements include route complexity, or likelihood of require interventions, passenger comfort, and autonomous-vehicle safety, relating to autonomous-vehicle passenger or vehicle safety.

The technology can be implemented with embedded, in-vehicle autonomous-driving navigation systems, or navigation systems that are used with, but not part of the vehicle, such as a portable GPS unit using an internet connection for obtaining at least map data.

In various embodiments, the system is configured generally to make decisions regarding routing and driving like a person would, consciously or sub-consciously, in manual driving between the same origin and destination. Regarding safety, for instance, if a person learns that a certain intersection is accident prone, then the driver may avoid the intersection.

Or if the driver notices that a lane is narrow or guardrails are close to the lane, the driver may avoid the road (in determining a route) or, if taking the segment, drive more carefully, or in a certain manner (intra-route vehicle control; for example, driving to the left of the lane), and pay more attention (e.g., special perception or sensing).

As another example, if the driver learns that there is a large pothole at a right edge of a lane, the driver may select another lane or drive center or left of center to avoid the pothole.

Regarding complexity, the driver may avoid routes, sub-routes or segments that are complex, requiring heavy or more-than-average driver attention—for the autonomous vehicle, such routes may thus cause the vehicle to ask the passenger to drive manually or may cause the passenger/driver to initiate transfer of control form the vehicle to the passenger/driver.

When the autonomous-vehicle or other navigation system can execute such functions autonomously—selecting a simple and effective route, and the autonomous vehicle executes the same—the driver has to intervene less, and can relax more with confidence that they can rely in the autonomous-driving and navigation systems, and so enjoy the autonomous-driving experience more.

While select examples of the present technology describe transportation vehicles or modes of travel, and particularly automobiles, the technology is not limited by the focus. The concepts can be extended to a wide variety of systems and devices, such as other transportation or moving vehicles including aircraft, watercraft, trucks, busses, trolleys, trains, the like, and other.

While select examples of the present technology describe autonomous vehicles, the technology is not limited to use with or in autonomous vehicles (fully or partially autonomous), or to times in which an autonomous-capable vehicle is being driven autonomously.

II. Host Vehicle—FIG. 1

Turning now to the figures and more particularly the first figure, FIG. 1 shows an example host structure or apparatus 10 in the form of a vehicle.

The vehicle 10 includes a hardware-based controller or controller system 20. The hardware-based controller system 20 includes a communication sub-system 30 for communicating with mobile or local computing devices 34 and/or external networks 40.

By the external networks 40, such as the Internet, a local-area, cellular, or satellite network, vehicle-to-vehicle, pedestrian-to-vehicle or other infrastructure communications, etc., the vehicle 10 can reach mobile or local systems 34 or remote systems 50, such as remote servers.

Example mobile or local devices 34 include a user smartphone 31, a first example user wearable device 32 in the form of smart eye glasses, and a second example user wearable device 33 in the form of a smart watch, and are not limited to these examples. Other example wearables 32, 33 include smart apparel, such as a shirt or belt, an accessory such as arm strap, or smart jewelry, such as earrings, necklaces, and lanyards.

Another example mobile or local device is a user plug-in device, such as a USB mass storage device, or such a device configured to communicate wirelessly.

Still another example mobile or local device is an on-board device (OBD) (not shown in detail), such as a wheel sensor, a brake sensor, an accelerometer, a rotor-wear sensor, throttle-position sensor, steering-angle sensor, revolutions-per-minute (RPM) indicator, brake-force sensors, other vehicle state or dynamics-related sensor for the vehicle, with which the vehicle is retrofitted with after manufacture. The OBD(s) can include or be a part of the sensor sub-system referenced below by numeral 60.

The vehicle controller system 20, which in contemplated embodiments includes one or more microcontrollers, can communicate with OBDs via a controller area network (CAN). The CAN message-based protocol is typically designed for multiplex electrical wiring with automobiles, and CAN infrastructure may include a CAN bus. The OBD can also be referred to as vehicle CAN interface (VCI) components or products, and the signals transferred by the CAN may be referred to as CAN signals. Communications between the OBD(s) and the primary controller or microcontroller 20 are in other embodiments executed via similar or other message-based protocol.

The vehicle 10 also has various mounting structures 35. The mounting structures 35 include a central console, a dashboard, and an instrument panel. The mounting structure 35 includes a plug-in port 36—a USB port, for instance—and a visual display 37, such as a touch-sensitive, input/output, human-machine interface (HMI).

The vehicle 10 also has a sensor sub-system 60 including sensors providing information to the controller system 20. The sensor input to the controller 20 is shown schematically at the right, under the vehicle hood, of FIG. 2. Example sensors having base numeral 60 ($60_1$, $60_2$, etc.) are also shown.

Sensor data relates to features such as vehicle operations, vehicle position, and vehicle pose, user characteristics, such as biometrics or physiological measures, and environmental-characteristics pertaining to a vehicle interior or outside of the vehicle 10.

Example sensors include a camera $60_1$ positioned in a rear-view mirror of the vehicle 10, a dome or ceiling camera $60_2$ positioned in a header of the vehicle 10, a world-facing camera $60_3$ (facing away from vehicle 10), and a world-facing range sensor $60_4$. Intra-vehicle-focused sensors $60_1$, $60_2$, such as cameras, and microphones, are configured to sense presence of people, activities or people, or other cabin activity or characteristics. The sensors can also be used for authentication purposes, in a registration or re-registration routine. This subset of sensors are described more below.

World-facing sensors $60_3$, $60_4$ sense characteristics about an environment 11 comprising, for instance, billboards, buildings, other vehicles, traffic signs, traffic lights, pedestrians, etc.

The OBDs mentioned can be considered as local devices, sensors of the sub-system 60, or both in various embodiments.

Local devices 34 (for example, user phone, user wearable, or user plug-in device) can be considered as sensors 60 as well, such as in embodiments in which the vehicle 10 uses data provided by the local device based on output of a local-device sensor(s). The vehicle system can use data from a user smartphone, for instance, indicating user-physiological data sensed by a biometric sensor of the phone.

The vehicle 10 also includes cabin output components 70, such as audio speakers $70_1$, and an instruments panel or display $70_2$. The output components may also include dash or center-stack display screen $70_3$, a rear-view-mirror screen $70_4$ (for displaying imaging from a vehicle aft/backup camera), and any vehicle visual display device 37.

III. On-Board Computing Architecture—FIG. 2

Figure 2:
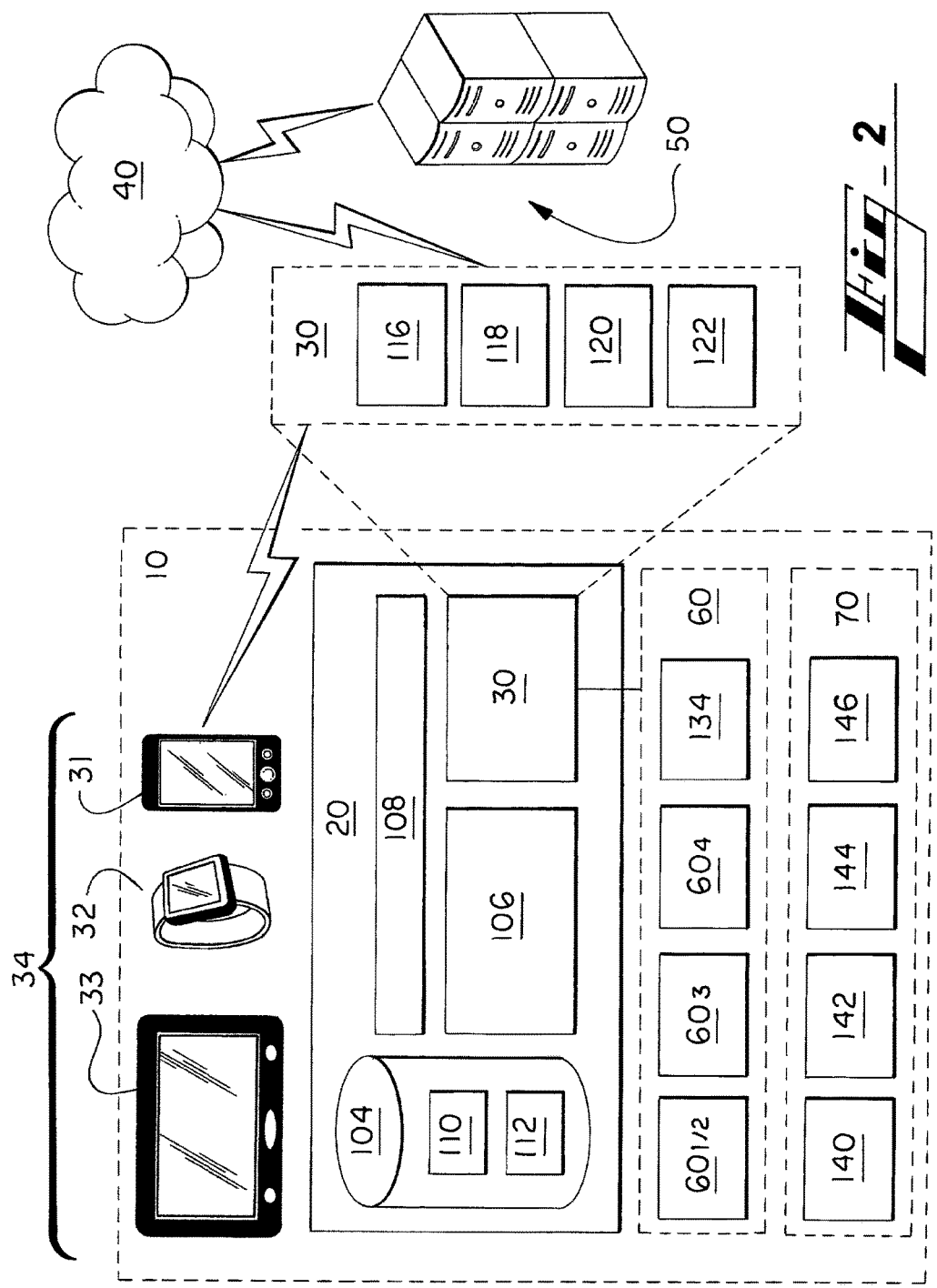
FIG. 2 illustrates schematically more details of an example vehicle computer of FIG. 1 in communication with the local and remote computing devices.

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA, for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

FIG. 2 illustrates in more detail the hardware-based computing or controller system 20 of FIG. 1. The controller system 20 can be referred to by other terms, such as computing apparatus, controller, controller apparatus, or such descriptive term, and can be or include one or more microcontrollers, as referenced above.

The controller system 20 is in various embodiments part of the mentioned greater system 10, such as a vehicle.

The controller system 20 includes a hardware-based computer-readable storage medium, or data storage device 104 and a hardware-based processing unit 106. The processing unit 106 is connected or connectable to the computer-readable storage device 104 by way of a communication link 108, such as a computer bus or wireless components.

The processing unit 106 can be referenced by other names, such as processor, processing hardware unit, the like, or other.

The processing unit 106 can include or be multiple processors, which could include distributed processors or parallel processors in a single machine or multiple machines. The processing unit 106 can be used in supporting a virtual processing environment.

The processing unit 106 could include a state machine, application specific integrated circuit (ASIC), or a programmable gate array (PGA) including a Field PGA (FPGA), for instance. References herein to the processing unit executing code or instructions to perform operations, acts, tasks, functions, steps, or the like, could include the processing unit performing the operations directly and/or facilitating, directing, or cooperating with another device or component to perform the operations.

In various embodiments, the data storage device 104 is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The data storage device 104 includes one or more storage modules 110 storing computer-readable code or instructions executable by the processing unit 106 to perform the functions of the controller system 20 described herein. The modules and functions are described further below in connection with FIGS. 3-5.

The data storage device 104 in some embodiments also includes ancillary or supporting components 112, such as additional software and/or data supporting performance of the processes of the present disclosure, such as one or more user profiles or a group of default and/or user-set preferences.

As provided, the controller system 20 also includes a communication sub-system 30 for communicating with local and external devices and networks 34, 40, 50. The communication sub-system 30 in various embodiments includes any of a wire-based input/output (i/o) 116, at least one long-range wireless transceiver 118, and one or more short- and/or medium-range wireless transceivers 120. Component 122 is shown by way of example to emphasize that the system can be configured to accommodate one or more other types of wired or wireless communications.

The long-range transceiver 118 is in some embodiments configured to facilitate communications between the controller system 20 and a satellite and/or a cellular telecommunications network, which can be considered also indicated schematically by reference numeral 40.

The short- or medium-range transceiver 120 is configured to facilitate short- or medium-range communications, such as communications with other vehicles, in vehicle-to-vehicle (V2V) communications, and communications with transportation system infrastructure (V2I). Broadly, vehicle-to-entity (V2X) can refer to short-range communications with any type of external entity (for example, devices associated with pedestrians or cyclists, etc.).

To communicate V2V, V2I, or with other extra-vehicle devices, such as local communication routers, etc., the short- or medium-range communication transceiver 120 may be configured to communicate by way of one or more short- or medium-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

By short-, medium-, and/or long-range wireless communications, the controller system 20 can, by operation of the processor 106, send and receive information, such as in the form of messages or packetized data, to and from the communication network(s) 40.

Remote devices 50 with which the sub-system 30 communicates are in various embodiments nearby the vehicle 10, remote to the vehicle, or both.

The remote devices 50 can be configured with any suitable structure for performing the operations described herein. Example structure includes any or all structures like those described in connection with the vehicle computing device 20. A remote device 50 includes, for instance, a processing unit, a storage medium comprising modules, a communication bus, and an input/output communication structure. These features are considered shown for the remote device 50 by FIG. 1 and the cross-reference provided by this paragraph.

While local devices 34 are shown within the vehicle 10 in FIGS. 1 and 2, any of them may be external to the vehicle and in communication with the vehicle.

Example remote systems 50 include a remote server (for example, application server), or a remote data, customer-service, and/or control center. A user computing or electronic device 34, such as a smartphone, can also be remote to the vehicle 10, and in communication with the sub-system 30, such as by way of the Internet or other communication network 40.

An example control center is the OnStar® control center, having facilities for interacting with vehicles and users, whether by way of the vehicle or otherwise (for example, mobile phone) by way of long-range communications, such as satellite or cellular communications. ONSTAR is a registered trademark of the OnStar Corporation, which is a subsidiary of the General Motors Company.

As mentioned, the vehicle 10 also includes a sensor sub-system 60 comprising sensors providing information to the controller system 20 regarding items such as vehicle operations, vehicle position, vehicle pose, user characteristics, such as biometrics or physiological measures, and/or the environment about the vehicle 10. The arrangement can be configured so that the controller system 20 communicates with, or at least receives signals from sensors of the sensor sub-system 60, via wired or short-range wireless communication links 116, 120.

In various embodiments, the sensor sub-system 60 includes at least one camera and at least one range sensor $60_4$, such as radar or sonar, directed away from the vehicle, such as for supporting autonomous driving. In some embodiments a camera is used to sense range.

Visual-light cameras $60_3$ directed away from the vehicle 10 may include a monocular forward-looking camera, such as those used in lane-departure-warning (LDW) systems. Embodiments may include other camera technologies, such as a stereo camera or a trifocal camera.

Sensors configured to sense external conditions may be arranged or oriented in any of a variety of directions without departing from the scope of the present disclosure. For example, the cameras $60_3$ and the range sensor $60_4$ may be oriented at each, or a select, position of, (i) facing forward from a front center point of the vehicle 10, (ii) facing rearward from a rear center point of the vehicle 10, (iii) facing laterally of the vehicle from a side position of the vehicle 10, and/or (iv) between these directions, and each at or toward any elevation, for example.

The range sensor $60_4$ may include a short-range radar (SRR), an ultrasonic sensor, a long-range radar, such as those used in autonomous or adaptive-cruise-control (ACC) systems, sonar, or a Light Detection And Ranging (LiDAR) sensor, for example.

Other example sensor sub-systems 60 include the mentioned cabin sensors ($60_1$, $60_2$, etc.) configured and arranged (for example, positioned and fitted in the vehicle) to sense activity, people, cabin environmental conditions, or other features relating to the interior of the vehicle. Example cabin sensors ($60_1$, $60_2$, etc.) include microphones, in-vehicle visual-light cameras, seat-weight sensors, user salinity, retina or other user characteristics, biometrics, or physiological measures, and/or the environment about the vehicle 10.

The cabin sensors ($60_1$, $60_2$, etc.), of the vehicle sensors 60, may include one or more temperature-sensitive cameras (for example, visual-light-based (3D, RGB, RGB-D), infra-red or thermographic) or sensors. In various embodiments, cameras are positioned preferably at a high position in the vehicle 10. Example positions include on a rear-view mirror and in a ceiling compartment.

A higher positioning reduces interference from lateral obstacles, such as front-row seat backs blocking second- or third-row passengers, or blocking more of those passengers. A higher positioned camera (light-based (for example, RGB, RGB-D, 3D, or thermal or infra-red) or other sensor will likely be able to sense temperature of more of each passenger's body—for example, torso, legs, feet.

Two example locations for the camera(s) are indicated in FIG. 1 by reference numeral $60_1$, $60_2$, etc.—on at rear-view mirror and one at the vehicle header.

Other example sensor sub-systems 60 include dynamic vehicle sensors 134, such as an inertial-momentum unit (IMU), having one or more accelerometers, a wheel sensor, or a sensor associated with a steering system (for example, steering wheel) of the vehicle 10.

The sensors 60 can include any sensor for measuring a vehicle pose or other dynamics, such as position, speed, acceleration, or height—for example, vehicle height sensor.

The sensors 60 can include any known sensor for measuring an environment of the vehicle, including those mentioned above, and others such as a precipitation sensor for detecting whether and how much it is raining or snowing, a temperature sensor, and any other.

Sensors for sensing user characteristics include any biometric or physiological sensor, such as a camera used for retina or other eye-feature recognition, facial recognition, or fingerprint recognition, a thermal sensor, a microphone used for voice or other user recognition, other types of user-identifying camera-based systems, a weight sensor, breath-quality sensors (for example, breathalyzer), a user-temperature sensor, electrocardiogram (ECG) sensor, Electrodermal Activity (EDA) or Galvanic Skin Response (GSR) sensors, Blood Volume Pulse (BVP) sensors, Heart Rate (HR) sensors, electroencephalogram (EEG) sensor, Electromyography (EMG), and user-temperature, a sensor measuring salinity level, the like, or other.

User-vehicle interfaces, such as a touch-sensitive display 37, buttons, knobs, the like, or other can also be considered part of the sensor sub-system 60.

FIG. 2 also shows the cabin output components 70 mentioned above. The output components in various embodiments include a mechanism for communicating with vehicle occupants. The components include but are not limited to audio speakers 140, visual displays 142, such as the instruments panel, center-stack display screen, and rear-view-mirror screen, and haptic outputs 144, such as steering wheel or seat vibration actuators. The fourth element 146 in this section 70 is provided to emphasize that the vehicle can include any of a wide variety of other in output components, such as components providing an aroma or light into the cabin.

IV. Various Performing Apparatus

Any functions disclosed herein can be performed by any one or more of various apparatus including and not limited to the vehicle 10, a mobile device 34, or remote system 50, such as a remote server or cloud computing apparatus.

Each performing apparatus is configured with suitable structure for performing the operations described. Example structure for a remote system 50 (a cloud server, for example) could include structures like any of the structures described in connection with the vehicle computing device 20, such as input and output components, a hardware-based computer-readable storage medium, or a data storage device, like the device 104 of FIG. 2, and a hardware-based processing unit (like the unit 106 of FIG. 2) connected or connectable to the computer-readable storage device by way of a communication link—like link 108—such as a computer bus or wireless structures.

The data storage device of the remote system 50 can be in any way like the device 104 described above in connection with FIG. 2. For example, the data storage device of the user device 34 can include one or more storage or code modules storing computer-readable code or instructions executable by the processing unit of the user device to perform functions described herein.

The data storage device of the remote system 50 in various embodiments also includes ancillary or supporting components, like those 112 of FIG. 2, such as additional software and/or data supporting performance of the processes of the present disclosure, such as one or more driver profiles or a group of default and/or driver-set preferences. The code modules supporting components are in various embodiments components of, or accessible to, one or more user device programs 302 configured in various embodiments for performing any of the functions other present technology.

IV. Additional Vehicle Components—FIG. 3

Figure 3:
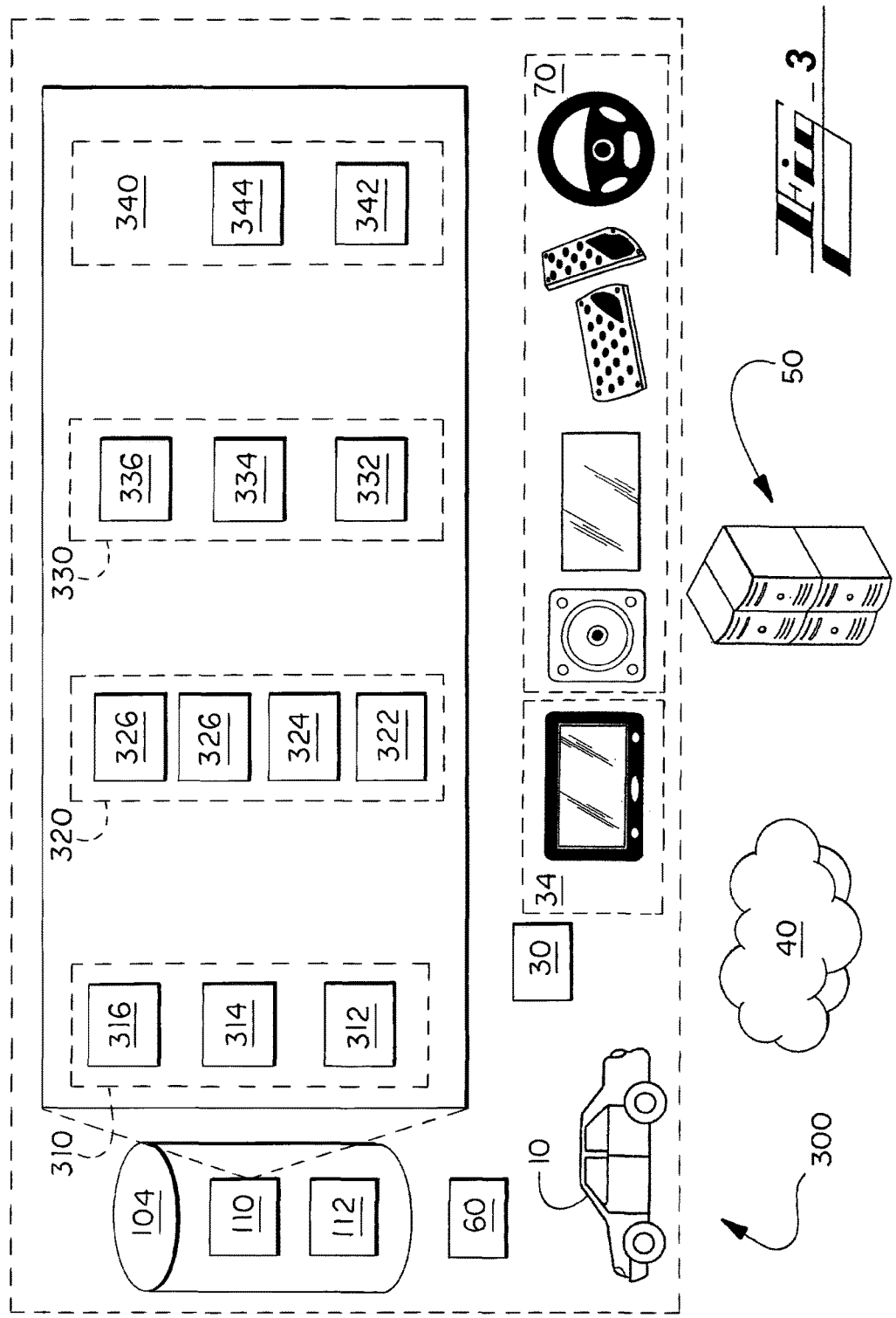
FIG. 3 shows another view of the vehicle, emphasizing example memory components.

FIG. 3 shows an alternative view 300 of the vehicle 10 of FIGS. 1 and 2 emphasizing example memory components, and showing associated devices.

As mentioned, any of the structure and functions described can also be part of and performed by any of one or more apparatus in various embodiments, such as by a remote or cloud system 50. Structure and functions described below are, by way of example and not required limitation, presented primarily from a perspective of the vehicle 10, with references to the cloud system 50, The data storage device 104 includes one or more modules 110, as mentioned, for performing the processes of the present disclosure. And the device 104 may include ancillary components 112, such as additional software and/or data supporting performance of the processes of the present disclosure. The ancillary components 112 can include, for example, additional software and/or data supporting performance of the processes of the present disclosure, such as one or more user profiles or a group of default and/or user-set preferences.

Any of the code or instructions described can be part of more than one module or sub-module. And any functions described herein can be performed by execution of instructions in one or more modules, though the functions may be described primarily in connection with one module by way of primary example. Each of the modules and sub-modules can be referred to by any of a variety of names, such as by a term or phrase indicative of its function.

Sub-modules can cause the processing hardware-based unit 106 to perform specific operations or routines of module functions. Each sub-module can also be referred to by any of a variety of names, such as by a term or phrase indicative of its function.

Example modules 110 and constituent sub-modules include:
Input Module 310
  an input-interface sub-module 312;
  a database sub-module 314;
  a user-profile learning sub-module 316;
Route-Generation Module 320
  a route-complexity sub-module 322;
  a route-comfort sub-module 324;
  a route-safety sub-module 326;
  an other-routing-elements sub-module 328;
Navigation Module 330
  route-execution sub-module 332;
  vehicle-perceptions sub-module 334;
  vehicle-controls sub-module 336;
Output-Communication Module 340
  a passenger notification sub-module 342;
  a database update sub-module 344.

Other vehicle components shown in FIG. 3 include the vehicle communications sub-system 30 and the vehicle sensor sub-system 60. These sub-systems act at least in part as input sources to the modules 110, and particularly to the input-interface sub-module 312.

Example inputs from the communications sub-system 30 include inputs from the user—passenger selections, etc.—and identification signals from mobile devices 34, which can be used to identify or register a mobile device, and so the corresponding user, to the vehicle 10.

The communication sub-system 30 receives and provides to the input module 410 data from any of a wide variety of sources, including sources separate from the vehicle 10, such as local or mobile devices 34, devices worn by pedestrians, other vehicle systems, local infrastructure (local beacons, cellular towers, etc.), satellite systems, and remote systems 50, providing any of a wide variety of information.

Example factor information from such sources (cloud servers 50, local device 34 and/or other) in various embodiments any one or more of presence, number, timing, frequency, size, shape, and location of factors, and regarding communication-related attributes, characteristics, or conditions of factors such as signal strength, communication-protocol, and location, along, adjacent, or otherwise affecting routes.

Factors data can be obtained in any of a variety of ways, such as by being retrieved, received, generated, or otherwise obtained. Example factors includes, or factors information indicates:
  road—quality, location, slope, slant, grade, steep-elevation or super-elevation areas, or other elevation features, surface type and condition, such as potholes, rough-pavement conditions, snow, rain or other indications of slipper or changed road-surface conditions, or other road-quality characteristics—some roads or route segments may be slicker than others, for instance;
  Highways (quality, location, etc.);
  Lanes, lane width, lane marking, lane-marking type, small-radius turns, other lane features, or other road features;
  Guardrails, shoulder type or size, or other road-side barriers, features, characteristics, or objects;
  U-turn features, small-radius turns, other turns, intersection types—complex intersections, other intersections features;

Intersections—location, size, complex intersections, number of lanes to cross, merge locations;

Limited-sight areas, or other vehicle-sensor- or driver-view considerations;

Communication infrastructure, such as road-side wireless beacons, cellular towers or coverage, smart corridors, satellite coverage, and low-communication-coverage areas regarding any of these—for example, non-coverage areas, or black-out, structure-shadow, landscape- or foliage-shadow, or dead zones;

Weather;

Time;

Building or tall trees locations or dimensions, which can affect access to communication infrastructure, as an example;

Nature characteristics—size and location of trees, lakes, rivers, bird breeding areas, amount of sun, angle of sun or shadows (from buildings, trees, etc.), contrast or brightness differences from light/shade, which can affect effectiveness of vehicle sensors such as a cameras, as just an example;

Tunnels, bridges, other under-vehicle or overhead or adjacent-to-road structures;

Traffic, driving patterns;

Driver or autonomous-driving-vehicle decisions,

Sensor data from vehicles driven along various routes;

Toll roads;

School zones;

Number of control points;

Level or quality of mapping data;

Date associated with map data (indicating freshness, for instance);

Characteristics of vehicles or objects using or interacting with (moving on, across, or adjacent, etc.) the road historically —passenger vehicles, commercial vehicles, low-speed or slow-moving vehicles, motorcycles, bicycles, pedestrians, animals (for example, deer, moose, kangaroo, cow, etc.);

Accidents, such as frequency of accidents, as a function of dates, time of day, duration, etc., for instance;

Common or likely false or less-than-ideal readings from vehicle sensors, communication structure, or perception devices, such as by vehicle cameras, radar, GPS receivers, or data useful in determining same. Erred readings could lead to confusing autonomous-vehicle sensor-system output, for instance, and result from obscuring buildings, other infrastructure, nature; sun/shadows caused for these or other reasons. Anticipated or likely false readings can affect one or more elements based on the configuration, such as adding to route complexity, or lower vehicle/passenger safety, until the false-reading condition is removed or figured out; and Anticipated or likely false readings can result from any of numerous conditions, such as under bridge (sun to shade) and camera may confuse the contrast changes as an object. As a result, the routing can avoid underpasses to limit complexity (lowering the likelihood of a needed intervention) and/or improve autonomous-driving safety (lowering likelihood of accident).

Road types, characteristics, and conditions—for example, highway vs local divided vs. undivided, road characteristic, paved or not, winding or not, under construction or not, industrial zones, with or without traffic lights, yield signs, stop sign, the like, or other Railroad crossing, or other such road-crossing data;

Number of turns, left and right turns, traffic volumes, neighborhoods passing-by/driving-through;

Air pollution—for example, above certain levels;

Noise-pollution—for example, above certain levels;

Visual-pollution—for example, graffiti, heavy concrete levels vs. nature;

Residential zones;

Commercial zones;

Geography-related crime data including crime rates per location;

Business hours;

Frequency of j-walking pedestrians;

School zones;

School hours;

Speed limits;

Commonly student drivers; and

Number and type of traffic, safety or other violations or tickets (DUI, speeding, etc.) issued in a time period—such as in a year, per month, etc.

Other example information from such sources (remote or cloud server system 50, for instance) includes user-identifying data, user-history data, user selections or user preferences contextual data (weather, road conditions, navigation, etc.), program or system updates—remote systems can include, for instance, applications servers corresponding to application(s) operating at the vehicle 10 and any relevant user devices 34, computers of a user or supervisor (parent, work supervisor), vehicle-operator servers, customer-control center system, such as systems of the OnStar® control center mentioned, or a vehicle-operator system, such as that of a taxi company operating a fleet of which the vehicle 10 belongs, or of an operator of a ride-sharing service.

Example inputs from the vehicle sensor sub-system 60 include and are not limited to:

vehicle kinematics sensors, such as vehicle-speed sensor (tire-rotation sensor for example), vehicle acceleration or other movement, such as an inertial-momentum unit (IMU), having one or more accelerometers, a vehicle pose or other dynamics, such as position, speed, acceleration, or height—for example, vehicle height sensor, brake sensors, steering angle sensor, any other sensors for providing any vehicle gauge or telematics information;

bio-metric/physiological sensors providing bio-metric data regarding vehicle occupants, such as facial features, voice recognition, heartrate, salinity, skin or body temperature for each occupant, etc.;

vehicle-occupant input devices, such as vehicle human-machine interfaces (HMIs), such as a touch-sensitive screen, buttons, knobs, microphones, and the like;

cabin sensors providing data about characteristics within the vehicle, such as vehicle-interior temperature, in-seat weight sensors, and motion-detection sensors; and environment sensors providing data about conditions about a vehicle, such as from external camera, distance sensors (for example, LiDAR, radar), and temperature sensors, precipitation or moisture sensor, or any sensor for sensing or measuring characteristics of an environment of the vehicle.

The view also shows example vehicle outputs 70, and user devices 34 that may be positioned in the vehicle 10. Outputs 70 include and are not limited to:

audio-output component, such as vehicle speakers;

visual-output component, such as vehicle screens;

vehicle-kinematics actuators, such as those affecting autonomous driving (vehicle brake, throttle, steering);

vehicle-climate actuators, such as those controlling HVAC system temperature, humidity, zone outputs, and fan speed(s); and local devices 34 and remote systems 34/50, to which the system may provide a wide variety of information, such as user-identifying data, user-biometric data, user-history data, contextual data (weather, time, amount of sun, angle of sun or shadows, building locations or dimensions, road conditions, etc.), instructions or data for use in providing notifications, alerts, or messages to the user or relevant entities such as authorities, first responders, parents, an operator or owner of a subject vehicle 10, or a customer-service center system, such as of the OnStar® control center.

The modules, sub-modules, and their functions are described more below.

V. Algorithms and Processes—FIG. 4

V.A. Introduction to the Algorithms

Figure 4:
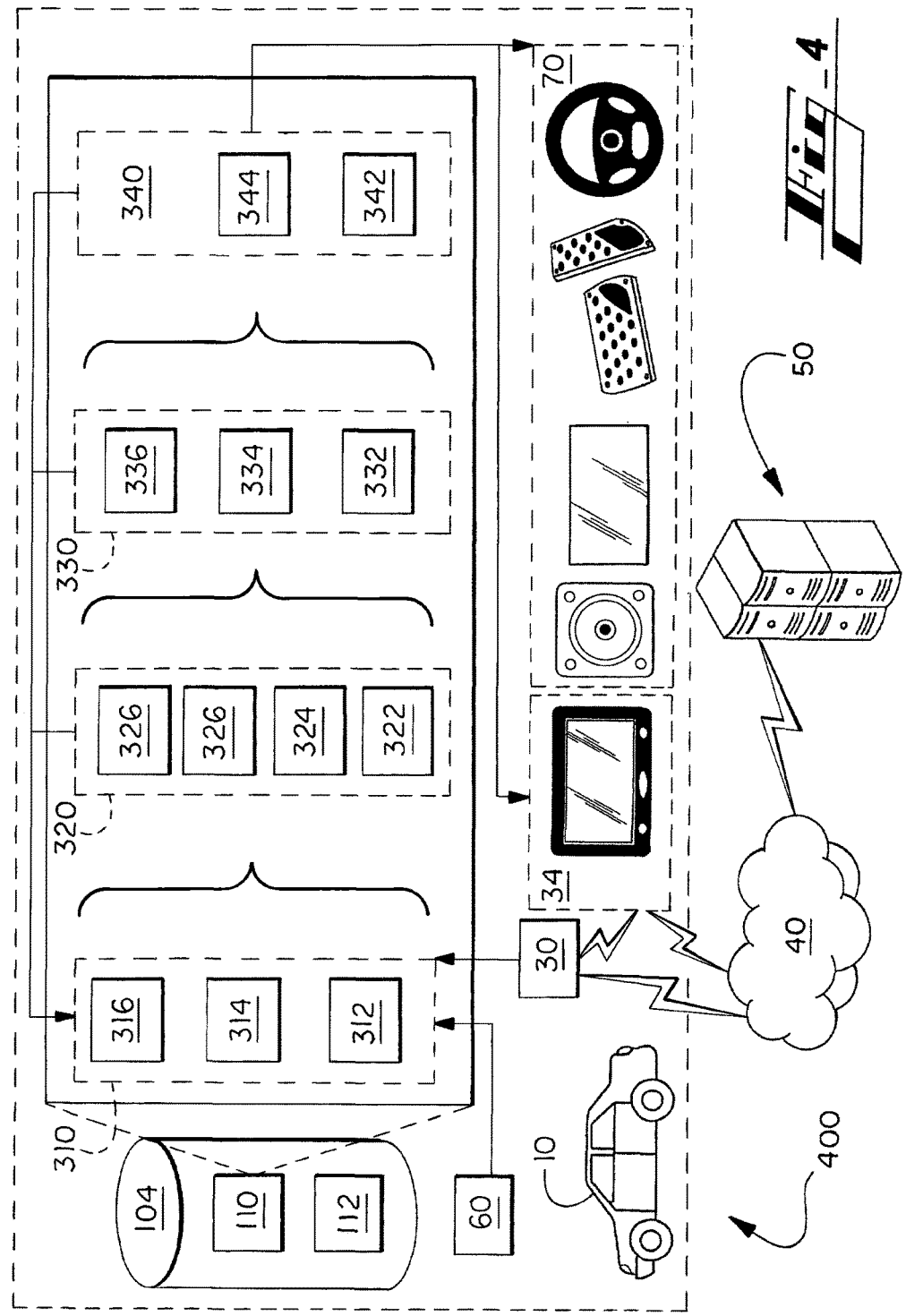
FIG. 4 shows interactions between components of FIG. 3.

FIG. 4 shows an example algorithm, process, or routine represented schematically by an operation flow 400, according to embodiments of the present technology.

Though a single flow 400 is shown for simplicity, any of the functions or operations can be performed in one or more or processes, routines, or sub-routines of one or more algorithms, by one or more devices or systems.

It should be understood that the steps, operations, or functions of the processes are not necessarily presented in any particular order and that performance of some or all the operations in an alternative order is possible and is contemplated. The processes can also be combined or overlap, such as one or more operations of one of the processes being performed in the other process.

The operations have been presented in the demonstrated order for ease of description and illustration. Operations can be added, omitted and/or performed simultaneously without departing from the scope of the appended claims. It should also be understood that the illustrated processes can be ended at any time.

In certain embodiments, some or all operations of the processes and/or substantially equivalent operations are performed by a computer processor, such as the hardware-based processing unit 106, a processing unit of an user mobile, and/or the unit of a remote device, executing computer-executable instructions stored on a non-transitory computer-readable storage device of the respective device, such as the data storage device 104 of the vehicle system 20, and/or other apparatus such as a remote cloud server 50 or mobile device 34.

The process can end or any one or more operations of the process can be performed again.

V.B. System Components and Functions

FIG. 4 shows the operation flow 400 of the components of FIG. 3 interacting according to various exemplary embodiments of the present technology.

The example modules 110, including the input module 310, the route-generation module 320, the navigation module 330, and the output-communication module 340, are described in further detail.

Though connections between sub-modules is not shown expressly, sub-modules interact with each other as needed to accomplish functions of the present technology.

V.B.i. Inputs Module 310

The inputs module 310 in various embodiments receives, retrieves, collects, generates or otherwise obtains any of a wide variety of types of information relevant to performance of other system functions. The system may be configured to use data from a remote or cloud database, such as of a remote system 50, maintaining historical data indicating traffic or safety-related trends (e.g., accident trends) or any of various metrics. Data can indicate, for instance, when and where interventions (passenger taking autonomous-vehicle control) were initiated by a passenger/driver or by a vehicle 10, or historical trip data for a user (e.g., what routes used, when), as just a few examples.

In addition, microscopic data analysis could be conducted to identify correlation between particular observed data and potential factors that caused the observed phenomenon.

The input-interface sub-module 312 of the inputs module 310, when executed by the hardware-based processing unit 106, receives, from any of a variety of sources described herein—vehicle sensors, vehicle HMI, user devices 34, remote systems 50, etc.—any of a wide variety of input messages or signals indicating information described herein. Example information includes road features, road-side characteristics, intersections features, elevation features, accident information, road-quality characteristics, and vehicle-sensor- or driver-view considerations. Other examples are provided below.

Input sources include vehicle sensors 60 and local or remote devices 34, 50, such as data storage components thereof, via the vehicle communication sub-system 30. Input devices also include a vehicle database, via the database sub-module 304.

The database sub-module 314 of the inputs module 310 stores any relevant data to the local memory 104. The data stored includes input data, from the input-interface sub-module 312, or from other system modules 320, 330, 340.

In various embodiments, the data stored includes user-profile data indicating various settings or preferences related particularly respectively to one or more autonomous-vehicle users.

The database sub-module 314 may include, or be part of or in communication with, storage portions of the vehicle 10, such as a portion storing the ancillary data 112 mentioned. The ancillary data may, as mentioned, include one or more user profiles. The profiles can be pre-generated by the system processor, or received from a remote source such as the server 50 or a remote user computer 34, as examples.

The profile for each user can include user-specific preferences communicated to the system by the user, such as via a touch-screen, keyboard, or microphone interface.

Preferences include any settings affecting a manner by which the system interacts with the user or with a non-vehicle system such as a server 50 or user device 34. Example preferences include volume, tone, or other sound preferences for media delivery, type or volume of notifications provided to the user, as just a few examples.

Information from the database sub-module 304 can also include historic data representing past activity between the system and a user, between the system and other users, or other systems and these or other users, for instance. If on one or repeated occasion(s), in response to certain stimulus, such as riding in an autonomous vehicle mode into a round-about, the user makes a certain action, such as taking manual control of the vehicle, the relationship can be stored in the user profile. The relationship can separately or also include a general indication that the user does not like roundabouts, or does not like autonomous driving through roundabouts, or at least a subject roundabout.

User preferences in various embodiments includes preferences for vehicle-driving characteristics affecting comfort or needed driving interventions (user taking manual control of vehicle from autonomous driving), or other route generation or execution functions. The preferences can indicate types of autonomous driving the user likes and/or doesn't like, for instance.

Preferences can also be received from a remote profile, such a profile stored at a user device 34 or a remote server 50, and local and remote profile features can be synchronized or shared between the vehicle 10 and the other apparatus.

The user-profile learning sub-module 316 of the inputs module 310, when executed by the processor, generates or updates the user profile mentioned. Updates may be stored locally, to the memory 104, whether via the database sub-module 314, and sent for storage to a remote database such as of the remote server 50. For learning user preferences, behavior, etc., the learning sub-module 316 in various embodiments is configured with artificial intelligence, computational intelligence, neural network or heuristic structures, or the like.

Output of the input modules 310 is in various embodiments provided to the modules 320, 330, 340 for use at the vehicle and/or other apparatus such as at a remote system.

V.B.ii. Route-Complexity Sub-Module 322

The route-complexity sub-module 322, of the route-generation module 320, in various embodiments determines a route based on data indicative of complexity of various route options, or a complexity-route index or value to use in selecting a route, The sub-module 322 may also determine actions to take in executing the route, such as where laterally to drive in a lane, what sensors to use, or how to use the sensors (for example, direction of focus and level of focus, zoom, etc.) at a pre-identified intersection.

Or the sub-module 322 may initiate a notification to a vehicle user, such as a passenger/driver, that an intervention will or may be needed, or is suggested, in situations where otherwise such notice would not be provided, or earlier than such notice would be normally be provided.

The user is referred to often herein as a passenger/driver because the vehicle 10 can be an autonomous vehicle in which the user is a passenger unless they take control, whether initiated by them or the vehicle—in which case they become a driver. Embodiments are not limited to the user being a passenger/driver, though, as the passenger could be in the back seat, and so not have an opportunity to take control as a driver.

In some embodiments, the system determines an autonomous-driving route based on multiple elements, including but not limited to complexity. And so the route-complexity sub-module 322 does not alone determine the route, or at least does not determine the route considering only complexity-related variables. Route comfort, autonomous-driving-route safety, and human stress levels are other examples elements that can be used in determining and/or executing the route.

In various embodiments, route complexity relates to a likelihood that an autonomous-vehicle passenger/driver will need to (e.g., be asked to) or want to take manual control of the vehicle 10 from autonomous driving. A first potential route, or segment of a route, for which the passenger/driver is expected to take control three times, would be associated with a higher complexity than a second potential route or segment for which the passenger/driver is expected to take control only once, for instance.

In contemplated embodiments, the analysis or comparison standard can include comparing expected interventions, or a likelihood of needed or user-initiated intervention, with respect to one or more other conditions, such as time or distance. The analysis can consider, for instance, a number of needed or expected interventions per mile, per five or ten miles, per segment, per route or trip, per minute, per hour, etc.

In various embodiments, route complexity relates to a difficulty level, or conversely, how easy it is, for the vehicle 10 to autonomously drive successfully through the route. The difficulty perspective coincides with the user-intervention perspective mentioned in the immediately preceding paragraph, but the two can differ, and the system can be programmed in various implementations to consider one or both.

Complexity, like each element for determining a route described herein (autonomous-driving safety, comfort, etc.), can be quantified in any of various ways, such as by a representative index, level, value, percentage, the like or other.

A complexity index may indicate that a first optional route has a 95% likelihood that no interventions will be needed, while a second optional route would be associated with a lower likelihood, or index, if the system determines the circumstances indicate that it is more likely for the second route for the vehicle 10 to transfer control to the passenger/driver and/or for the passenger/driver to initiate such transfer.

The system can be configured to display such index values, for example, respective percentages for complexity or takeover likelihood, such as in a chart, table, list, or on respective route representations on a digital map presentation from which the user can select a route or see the indexes of a determined preferred route and of alternative routes. Such presentation can also include indexes for other elements, such as automated-driving safety, comfort, pollution (noise, air, etc.), or can include a combined—for example, weighted—index for various elements. The weighting can be system-set or user-set, and can be established based at least in part on the user profile.

In various implementations, selecting a route with less driving complexity reduces the need and frequency of driver interventions for a semi-automated or automated vehicle.

Determinations of whether a passenger/driver will need or want to take manual control can be based on any of a wide variety of considerations. Example considerations include i) historic or prior same-driver data, ii) historic or prior various-driver data, and iii) route-features, or map-attributes, data:

i) Historic or prior same-driver data:
   a. Indicates circumstances under which a subject passenger/driver has in the past taken manual control over the vehicle 10 from autonomous driving. The data can relate to when the users traveled by autonomous driving on the same or similar routes, depending on system programming. Data indicating the circumstances can be stored in the user profile, locally and/or remotely.
   b. Example circumstance data indicates locations on a route or segment at which the passenger/driver decided to take control, such as by applying the brake or accelerator pedal or turning the steering wheel.
   c. In some cases, the vehicle 10 may have initiated manual takeover because of a determined insufficiency in vehicle sensing or control, such as if the vehicle 10 determines that perception or sensor data is inconsistent or otherwise not sufficient enough to warrant high-confidence autonomous driving during a segment.
   d. As an example regarding passenger-initiated takeover, the passenger/driver may have chosen to take over each of four times that the vehicle 10 was autonomously driving with the passenger/driver on Elm Street, passing First Street, headed North, for instance, but never taken control when the vehicle 10 was autonomously driving on Birch Street, passing First Street, headed North. In this example, the segment along Birch would have a lower complexity value or index. Other factors may come into play, so that Birch may not be the ultimate best segment or route choice, such as time-to-traverse, traffic considerations, other elements (safety, etc.), but as far as complexity alone, the Birch segment is preferred.

e. Some contemplated example circumstances, in which the subject passenger/driver could have taken manual control over the vehicle 10 from autonomous driving, relate to a manner in which the vehicle 10 was being driven autonomously, outside of location. The manners can include, for instance, one or a combination of speed, distance traveled, turning, turns within a period of time or distance, time of day, day of week, time of month, time of year, the like or other.

f. As an example, the passenger/driver may have chosen to takeover when the vehicle 10 makes many (for example, three or more) turns consecutively (for example, within a relatively short, or pre-set, amount of time or distance traveled). In this example, a route or segment that avoids such turning requirements for the autonomous driving system would have a lower complexity value or index, at least regarding turning-based complexity, as compared to a route or segment requiring less turning. Other factors could raise the complexity level of a low or no-turn route or segment, though, such as a lot of expected stop and go, such as due to construction or traffic along the route or segment.

ii) Historic or prior various-drivers data:
a. This data can be the same as the historic same-driver data, except relating to multiple drivers, whether including the subject driver. The data can relate to occasions in which the users traveled by autonomous driving on the same or similar routes, depending on system programming.
b. The data can be referred to as crowd-sourced data, as it compiles driving circumstances from many autonomous vehicles.
c. In some implementations, routes or segments that have lower number of driver interventions, or higher continuity of vehicle-autonomous-driving engagement, based on historic data, would have lower complexity indexes, and vice versa, at least from the historic various-driver perspective. Overall complexity can also be affected by user-specific historic data, or map attributes, for instance.
d. In some embodiments, the data, or a special, more valuable sub-set of the data, is same-vehicle data, being received from vehicles that are of the same type as a subject vehicle. For instance, if a subject vehicle 10, for which the system is determining a route, is a Chevy Malibu MY 2016, then same-vehicle data relating to route complexity would be received from only Chevy Malibu's made in 2016, or those and any other vehicles determined to have the same relevant characteristics, such as sensors, sensor positioning—which depends on vehicle size (height, etc.)—vehicle dynamics, and select autonomous driving software features. Same-vehicle context data, specific to a subject vehicle and route, for instance, may be stored locally at the host vehicle.
e. In some embodiments, the data, or valuable sub-set of the data is similar- or related-vehicle data, being received from vehicles that are of a similar or related type as a subject vehicle.
f. If a subject vehicle 10, for which the system is determining a route, is a Sierra Denali 2017, in an implementation, then data received from other pick-up trucks, or broader still other trucks (SUVs, etc.), of similar size, and relating to route complexity, would be considered similar-vehicle data. These vehicles are relevant to this data group, or sub-group, because they would have relevant similarities, such as sensors, sensor positioning—which depends on vehicle size (height, etc.), vehicle dynamics, and autonomous driving software features. Same-vehicle context data, specific to a subject vehicle and route, for instance, may be stored locally at the host vehicle 10.

iii) Route-features data:
a. This data indicates complexity by map or navigation data, whether related also to past driving characteristics—same-driver or other drivers' take-overs, etc.
b. Using this data is helpful especially when accurate historic data is not available or not sufficiently available (e.g., amount or quality) from vehicles having traveled routes or segments under consideration.

In various embodiments, the system is configured to quantify complexity of one or more routes or segments based complexity levels for multiple factors. The determination based on multiple factors can be structured in a variety of ways. In one, the system is programmed to determine the complexity level or index for each subject route or segment, based on complexity relating to multiple factors, according to:

$$\sum_{i}^{n} wd_i z_i$$

wherein:
$z_i$ is the complexity of an $i^{th}$ factor of n factors;
$wd_i$ is the weighting factor of the $i^{th}$ factor; and
the factors can include any of those referenced or inferred herein, including any of the factors listed in section IV.

V.B.iii. Route-Comfort Sub-Module 324

The route-comfort sub-module 324, of the route-generation module 320, in various embodiments determines a route based on data indicative of comfort level associated with various route options, or determines a comfort-route index or value to use in selecting a route.

The sub-module 324 may also determine actions to take in executing the route, such as where laterally to drive in a lane (in-route control), what sensors to use or how to use the sensors (in-route perception adjustment) for example, direction of focus and level of focus, zoom, etc.) at a pre-identified intersection.

Actions may be performed to increase comfort or limit a driving risk, as a few examples.

Or the sub-module 324 may initiate a notification to the passenger/driver that a low comfort situation (for example, bumpy road) is being approached, in situations where otherwise such notice would not be provided, or earlier than such notice would be otherwise provide.

In some embodiments, the system determines an autonomous-driving route based on various elements, including but not limited to route comfort level, and so the route-comfort sub-module 324 does not alone determine the route. Route complexity may be another element in determining and/or executing the route, for instance.

In various embodiments, route comfort relates to a level of comfort that the user (passenger/driver) will have when the vehicle is driving along the route. The system may be programmed with default or system-set parameters defining or indicating comfort preferences. In some embodiments the system is configured to allow the user to customize some of the parameters. User-initiated settings or preferences can be stored in the mentioned user profile, at the vehicle 10 and/or external to the vehicle—for example, at a remote or cloud server 50.

Example system settings can include a smoother route or segment being viewed as more comfortable than a bumpier route or segment, and a route or segment having less turns, or being simpler, being considered more comfortable than a route or segment with more turns, and especially more turns within a relatively small window of time, such as three turns in thirty seconds, as an example.

Regarding example user-set preferences, the system may be configured to allow the passenger-driver to establish a setting or preference indicating that round-abouts (or other type of circular junction) are uncomfortable for the user. Though most people may find them preferable over traditional four-way stops, this passenger-driver may not, and so set the system accordingly to lower comfort level associated with routes or segments having a round-about. The setting or preference can be stored in the mentioned user profile, at the vehicle 10 and/or external to the vehicle—for example, at a remote or loud server 50.

The route comfort element in various embodiments relates to one or more other elements, such as the complexity element. For instance, a complexity level or index, for a route or segment, can be a variable in determining the comfort level or index, for the route or segment. A passenger/driver having to take control unexpectedly due to a complex segment would typically be less comfortable with the overall ride.

Concerning autonomous driving, the comfort level of the passenger/driver is viewed with respect to the autonomous driving—that is, though the passenger/driver may be more comfortable upon intervening, to take manual control of the vehicle, such as if they initiated takeover because they were feeling uncomfortable with the autonomous driving, the episode is viewed as the passenger/driver having had relatively low comfort with the autonomous driving on the route or segment, which lead to the intervention.

Another perspective for determining a comfort level or index is a workload perspective, or how hard a passenger driver would need to work, how often, for how long, or to what degree the passenger would need to engage—with the vehicle, drive experience, etc. Even short of having to intervene, a passenger/driver comfort level can be diminished by the vehicle regularly asking the passenger/driver to make decisions, as just one example of increase workload. The driver intervening clearly has an increased-workload aspect, lowering comfort.

Route or segment comfort, like each element for determining a route described herein (autonomous-driving safety, complexity, etc.), can be quantified in any of various ways, such as by a representative index, level, value, percentage, the like or other. A comfort index may indicate that a first optional route is expected to have an 80% level of comfort, based on system settings and conditions or factors related to the route, while a second optional route would be associated with a higher level or index of comfort if the system determines the factors indicate that the passenger will be more comfortable if the vehicle 10 drove the second route.

The system can be configured to display such index values, for example, respective percentages for comfort, by chart, table list, or on respective route options in a digital map presentation from which the user can select a route or see the indexes of a determined preferred route and of alternative routes. Such presentation can also include indexes for other elements, such as autonomous-driving safety, complexity/intervention risk, pollution (noise, air, etc.), or can include a combined—for example, weighted—index for various elements. The weighting can be system set or user set, and can be established based at least in part on the user profile.

Determinations of whether a passenger/driver will be comfortable with a route or segment condition—e.g. speed, turn radius, number of turns, road smoothness, road elevation change, etc., can be based on any of a wide variety of considerations.

As with the route-complexity element, example considerations here can also include i) historic or prior same-driver data, ii) historic or prior various-drivers data, and iii) route-features/map-attributes data:

i) Historic or prior same-driver data:
  a. This data indicates circumstances under which a subject passenger/driver has in the past expressed comfort or discomfort with a route. A user taking manual control is an example indication of discomfort.
  b. The system can also interpret user statements, gestures, or other behavior sensed. The system may be configured, for instance, to—if the user says, "whoa!" in a nervous type of voice on each of three occasions that the vehicle 10 drive autonomously over a large bridge, or only when the vehicle goes over the bridge and is in the lane closest to the edge of the bridge—determine that the user is not comfortable in such circumstances.
  c. The data indicating the prior experiences can be stored in the user profile, locally and/or remotely.

ii) Historic or prior various-drivers data:
  a. This data can be the same as the historic same-driver data, except relating to multiple drivers, whether including the subject driver. The data can relate, depending on system programming, to instances in which the users traveled by autonomous driving on the same or similar routes. The data can be referred to as crowd-sourced data, as it compiles driving circumstances from many autonomous vehicles.
  b. In some implementations, routes or segments that have lower comfort indicators for various users, based on historic data, would generally have lower comfort indexes, and vice versa, at least from the historic various-driver perspective—for example, overall comfort can also be affected by user-specific historic data, or map attributes, for instance.
  c. As with the complexity element, in various embodiments for the comfort element, and all elements, the data, or a special, more valuable sub-set of the data, is same-vehicle data, being received from vehicles that are of the same type as a subject vehicle.
  d. And, the data, or valuable sub-set of the data is similar- or related-vehicle data, being received from vehicles that are of a similar or related type as a subject vehicle.

iii) Route-features data:
  a. Comfort can also be based on factors indicated by map or navigation data, whether related also to past driving characteristics—same-driver or other drivers' take-overs, etc.

b. This approach is helpful especially when data is not available from vehicles having traveled routes or segments under consideration, or not as much of such prior-travel data is available as would be preferred, or as available for other routes or segments.

In various embodiments, the system is configured to quantify comfort of one or more routes or segments based on comfort levels for multiple factors. The determination based on multiple factors can be structured in a variety of ways. In one, the system is programmed to determine the comfort level or index for each subject route or segment, based on comfort relating to multiple factors, according to:

$$\sum_{i}^{n} wr_i y_i$$

wherein:
- $y_i$ is the comfort index of the $i^{th}$ factor of n factors;
- $wr_i$ is the weighting factor of the $i^{th}$ comfort factor; and
- the factors can include any of those referenced or inferred herein, including any of the factors listed in section IV.

V.B.iv. Route-Safety Sub-Module 326

The autonomous-driving route-safety sub-module 326, of the route-generation module 320, in various embodiments determines a route, or a safety-route index or value to use in selecting a route, based on data indicative of comfort level associated with various route options.

The sub-module 326 may also determine actions to take in executing the route, such as where laterally to drive in a lane, what sensors to use or how to use the sensors (for example, direction of focus and level of focus, zoom, etc.) at a pre-identified intersection. The actions may be performed to increase autonomous-driving safety or limit risk of accident, undue vehicle wear and tear, a crime event, or other negative situation from the perspective of the passenger and/or vehicle.

Or the sub-module 326 may initiate a notification, or real-time warning, to the passenger/driver that a safety situation related to the autonomous driving (even if before departure or after parked, etc.) is being approached, in situations where otherwise such notice would not be provided, or earlier than such notice would be otherwise provide. The situation need not be a surely imminent situation, but could indicate a potential, even if low, of a situation based on factors on hand, including historic data, for instance. An example situation is a side-impact—the system can notify the passenger/driver of a potential side-impact as an intersection is being approached at which the system has determined that side-impact accidents are common. This notice can be provided even if no vehicle is approaching from the side, or can be provided especially if so, or with more urgency—for example, multi-mode (audio, light, haptic), or more urgent version of any mode.

The system in various embodiments considers characteristics of potential safety-related incidents, such as number of related or similar safety-related incidents at the same location, such as an intersection or stretch of highway, and/or severity of the incidents.

In some embodiments, the system determines an autonomous-driving route based on various elements, including but not limited to autonomous-driving route safety level, and so the route-safety sub-module 326 does not alone determine the route, or at least does not determine the route considering only safety-related variables. Route complexity and rider comfort may be other elements in determining and/or executing the route, for instance.

The system may be programmed with default or system-set parameters defining or indicating autonomous-driving safety preferences. In some embodiments the system is configured to allow the user to customize some of the parameters. User-initiated settings or preferences can be stored in the mentioned user profile, at the vehicle 10 and/or external to the vehicle—for example, at a remote or cloud server 50.

Example system settings, whether system (for example, designer or manufacturer original setting) or user set, can include a crowded street environment, such as near Times Square in Manhattan, being viewed as less safe than less-crowded area.

The safety element in various embodiments relates to other elements, such as the complexity element. For instance, the system could be configured to determine a relatively high safety risk or index in connection with a so-called rough part of town—having, for example, graffiti, higher crime, etc.

The system may also for the same part of town, for similar reasons, associated the same part of town with a relatively low comfort level, as the passenger is likely to feel uncomfortable driving through the area, especially at certain times. Still further, the same area could rank very low for scenery, or have a relatively high visual pollution.

Route or segment safety, like each element for determining a route described herein (complexity, comfort, etc.), can be quantified in any of various ways, such as by a representative index, level, value, percentage, the like or other. An autonomous-driving safety index may indicate that a first optional route is expected to have an 5% level or risk of a safety incident, based on system settings and conditions or factors related to the route, while a second optional route would be associated with a higher level or index of safety if the system determines factors indicate that a safety incident risk is higher if the vehicle 10 drove autonomously along the second route.

The system can be configured to display such index values, for example, respective percentages for autonomous-driving safety, on a chart, table, list or respective route options in a map presentation from which the user can select a route or see the indexes of a determined preferred route and of alternative routes. Such presentation can also include indexes for other elements, such as autonomous-driving comfort, complexity/intervention risk, pollution (noise, air, etc.), or can include a combined—for example, weighted—index for various elements. The weighting can be system set or user set, and can be established based at least in part on the user profile.

Determinations of likelihood that the vehicle 10 and/or passenger will be safe and free from injury (for example, undue wear and tear) can be based on any of a wide variety of considerations. As with the route-complexity and comfort elements, example considerations for autonomous-driving-related safety can also include i) historic or prior same-driver data, ii) historic or prior various-drivers data, and iii) route-features/map-attributes data:

i) Historic or prior same-driver data:
   a. This data indicates circumstances under which a subject passenger/driver or subject driver experience a safety-related incident, such as an accident, pot-hole incident, heavy crowd, etc. along a route or segment.
   b. The system can also interpret user statements, gestures, or other behavior sensed. The system may be configured, for instance, to—if the user says, "I don't like this area" in a nervous type of voice when the vehicle 10 is driving autonomously through an area—determine that the area is not safe, or should be associated in the routing with a relatively lower level of autonomous-driving safety, and/or with a lowered level of autonomous-driving comfort by way of the autonomous-driving comfort sub-module 324.

c. Data indicating the prior experiences can be stored in the user profile, locally and/or remotely.

ii) Historic or prior various-driver data:
 a. This data can be the same as the historic same-driver data, except relating to multiple drivers, whether including the subject driver. The data can relate to when the users traveled by autonomous driving on the same or similar routes, depending on system programming.
 b. Regarding autonomous-driving safety, benefits of implementation can include, inter alia, preventing recurrence of a similar accident involving the subject vehicle (vehicle for which the route is being generated or executed) at the same location.
 c. The data can be referred to as crowd-sourced data, as it compiles driving circumstances from many autonomous vehicles.
 d. In some implementations, routes or segments that have lower safety indicators for various users, based on historic data, would generally have lower safety indexes, and vice versa, at least from the historic various-driver perspective—for example, overall autonomous-driving safety can also be affected by user-specific historic data, or map attributes, for instance.
 e. As with the autonomous-driving complexity and comfort elements, in various embodiments for the autonomous-driving-related safety element, and all elements, the data, or a special, more valuable sub-set of the data, is same-vehicle data, being received from vehicles that are of the same type as a subject vehicle.
 f. And, the data, or valuable sub-set of the data is similar- or related-vehicle data, being received from vehicles that are of a similar or related type as a subject vehicle.

iii) Route-features data:
 a. Autonomous-driving-related safety can also be based on factors indicated by map or navigation data, whether related also to past driving characteristics—same-driver or other drivers' take-overs, etc.
 b. This approach is helpful especially when data is not available from vehicles having traveled routes or segments under consideration, or not as much of such prior-travel data is available as would be preferred, or as available for other routes or segments.

In various embodiments, the system is configured to quantify autonomous-driving-related safety, for the user or vehicle, for one or more routes or segments based on safety levels from various factors. The determination based on multiple factors can be structured in a variety of ways. In one, the system is programmed to determine the autonomous-driving safety level, risk, or index for each subject route or segment, based on comfort relating to multiple factors, according to:

$$\sum_{i}^{n} w_i x_i$$

wherein:
 $x_i$ is the risk of the $i^{th}$ factor of n factors;
 $w_i$ is the weighting factor of the $i^{th}$ factor; and
 the factors can include any of those referenced or inferred herein, including any of the factors listed in section IV.

V.B.v. Additional-Routing-Elements Sub-Module(s) 328

The other- or additional-routing-elements sub-module(s) 328, of the route-generation module 320, in various embodiments determines a route based on data indicative of any of various other elements, or determines indexes or values used to determine a route.

Example additional elements include sound pollution or characteristics, air pollution or characteristics, visual pollution (graffiti, large amounts of cement vs. nature), other pollution considerations, availability of infrastructure (for example, wireless communication beacons, road-side hot spots, etc.), automated-vehicle performance, automated-vehicle workload to, for example, maximize automated-driving capability.

Infrastructure availability can indicate characteristic such as location, size, and/or type of, smart corridors, cellular coverage, satellite coverage, beacons, hotspots, V2V, V2I, V2X, etc. Vehicle routing (which segments to choose, for example) or positioning (which lane, for example) may improve vehicle accessibility to user enjoyment, telematics, vehicle positioning, data about traffic changes (such as data indicating that an event crowd was or is about to be released), or other data access.

Communication infrastructure can also be a safety feature—where by the user and vehicle are safer if communication access is present, such as in the event of a crime, running out of gas, breakdown, etc.

Access to communication infrastructure can be affected by various factors including location of roads with respect to wireless transmitters, position and size of environmental concerns, such as buildings or tall trees.

The additional-element sub-module(s) 328 may also determine actions to take in executing the route, such as where laterally to drive in a lane (in-route autonomous-driving control), what sensors to use or how to use the sensors (for example, direction of focus and level of focus, zoom, etc.—in-route autonomous-vehicle perception modification) at a pre-identified intersection. The actions may be performed to improve driver or vehicle health, for instance.

Or the sub-module 328 may initiate a notification, or real-time warning, to the passenger/driver that a relevant other situation related to the autonomous driving (even if before departure or after parked, etc.) is being approached, in situations where otherwise such notice would not be provided, or earlier than such notice would be otherwise provide. The system could be configured to advise the user on routing or decisions, such as, "it looks like you are headed home, traffic is heavy on your normal route; would you like to take the longer though more scenic route?"

The system in various embodiments considers characteristics of other-element situations, such as sound pollution or characteristics, air pollution or characteristics, visual pollution (graffiti, large amounts of cement vs. nature), other pollution considerations, availability of infrastructure (for example, wireless communication beacons, road-side hot spots, etc.), automated-vehicle performance, automated-vehicle workload to maximize automated-driving capability, or other expected affect to or effect on the vehicle from road conditions, for example.

In some embodiments, the system determines an autonomous-driving route based on multiple elements.

The system may be programmed with default or system-set parameters defining or indicating autonomous-driving other-element preferences. In some embodiments the system is configured to allow the user to customize some of the parameters. User-initiated settings or preferences can be stored in the mentioned user profile, at the vehicle 10 and/or external to the vehicle—for example, at a cloud server 50.

Example system settings, whether system set (for example, designer or manufacturer original setting) or user set, can include a setting that construction sounds are highly disfavored, for instance.

The safety element in various embodiments relates to other elements, such as the safety or comport elements. For instance, the system could be configured to determine a relatively high safety risk or index in connection with a rough patch of road, affecting vehicle and possibly passenger safety, also affect vehicle performance and perhaps noise considerations under this other-elements module(s).

Any of the other elements, like each element for determining a route described herein (complexity, comfort, etc.), can be quantified in any of various ways, such as by a representative index, level, value, percentage, the like or other. Example other elements include for example, sound pollution or characteristics, air pollution or characteristics, visual pollution (graffiti, large amounts of cement vs. nature), other pollution considerations, availability of infrastructure (for example, wireless communication beacons, road-side hot spots, etc.), automated-vehicle performance, automated-vehicle workload. An autonomous-driving index regarding sound or noise pollution may indicate that a first optional route is expected to have a 5% level or risk of an at-least-threshold level of undesirably sound, while another route has a 10% index or risk of the same, for instance.

The system can be configured to display such index values, such as respective percentages for autonomous-driving safety, on a chart, table, list, or respective route options in a map presentation from which the user can select a route or see the indexes of a determined preferred route and of alternative routes. Such presentation can also include indexes for other elements, such as autonomous-driving comfort or complexity/intervention risk, or can include a combined—for example, weighted—index for various elements. The weighting can be system set or user set, and can be established based at least in part on the user profile.

Determinations of likelihood that the vehicle 10 and/or passenger will be exposed to conditions related to other elements—such as sound pollution or characteristics, air pollution or characteristics, visual pollution (graffiti, large amounts of cement vs. nature), other pollution considerations, availability of infrastructure (for example, wireless communication beacons, road-side hot spots, etc.), automated-vehicle performance, automated-vehicle workload to, for example, maximize automated-driving capability, etc.— can, as with autonomous-driving safety complexity, comfort, etc., be based on any of a wide variety of considerations. As with them, example considerations for the other autonomous-driving-related elements can also include i) historic or prior same-driver data, ii) historic or prior various-drivers data, and iii) route-features/map-attributes data.

These considerations (i)-(iii) are described above regarding autonomous-driving safety, complexity, and comfort, and are not provided here in connection with additional elements—such as sound pollution or characteristics, air pollution or characteristics, visual pollution (graffiti, large amounts of cement vs. nature), other pollution considerations, availability of infrastructure (for example, wireless communication beacons, road-side hot spots, etc.), automated-vehicle performance, automated-vehicle workload to, for example, maximize automated-driving capability, etc.— in the interest of brevity. The text and spirit of that disclosed regarding those elements, including the equations for determining indexes (using i factors), is considered disclosed here with analogy to the other-element contexts—noise, air, or visual pollution, scenery, vehicle performance, vehicle capabilities, etc.

V.B.vi. Route-Selection Module 320 Summary

The system is configured in various embodiments to automatically select the best route, based on relevant system settings, elements, conditions, and factors, or to select a preferred route based also on some real-time input from the user and/or a remote system 50.

User input can include, for instance, a selection of optional routes presented by vehicle map with respective index values shown for the routes.

V.B.vii. Route-Execution Sub-Module 332

Turning to the navigation module 330, the route-execution sub-module 332, when executed, initiates performance of the route determined at the route-selection module 320.

In various embodiments the system is configured to implement the route, such as by actuating vehicle autonomous functions, such as steering, braking, and accelerating functions.

V.B.viii. Vehicle-Perceptions Sub-Module 334

As mentioned, various modules may determine actions to take in executing the route such as manners to control vehicle perception systems—for example, what sensors to use, how to use the sensors (for example, direction of focus and level of focus, zoom, etc.) at a pre-identified intersection, or how to process sensor data.

The vehicle-perceptions sub-module 334, of the navigation module 330, initiates execution of special perception or sensing actions determined by the route-selection module 320.

Further regarding adaptation of autonomous-vehicle control or output systems along a route, or route execution strategy, to minimize risk according to any element(s)— complexity, comfort, safety, etc.

As an example, regarding complexity, vehicle perception functions can be modified based on prior data indicating past driver interventions (e.g., historic data regarding a same vehicle and/or other vehicles) at specific locations and/or under other subject conditions (e.g., lighting (sun/shade), weather, time of day, etc.), in order to lower risk of needed intervention in execution of a route being determined presently:

- Adaptation of vehicle perception systems at locations where previous interventions have occurred;
- Adaptation of vehicle perception systems to apply additional scrutiny to areas in which it is difficult to consistently obtain high-quality image data (or, troublesome image region(s));
- Adaptation of vehicle perception systems to apply alternative sensor techniques, such as sensor fusion (using different sensor combinations, of sensor or sensor data), and using different filters (for example, ignore anomalous sensor reading);
- Adaptation of vehicle perception systems can include, for example, focusing more processing resources/filtering/sensors on an area—for example, where more accidents happen, or sensor misreading is determined relatively likely, such as because birds tend to in mass through the area, something off based on historic data;
- Adaptation of vehicle perception systems can include, for example, averaging various readings, or performing more or otherwise different averaging and/or filtering to get a better result based on expected conditions; and Adaptation of vehicle perception systems can be made to avoid or otherwise deal with false alarms. For example, system can review log data associated with one or more vehicles and see that some sensors pick up a feature along a route while others do not, and radar signal comes in and out, and notice that there seems to be some cluttered.

In various embodiments, the system uses another sensor to confirm, cross-validate, or determine whether a perceived indication of clutter or false reading(s), is clutter indeed.

V.B.ix. Vehicle-Controls Sub-Module 336

As mentioned, various modules may determine actions to take in executing the route such as manners to drive within the route. The action may include, for instance, initiating provision of vehicle communications to the passenger/driver and/or initiating select vehicle control, such as where laterally to drive in a lane.

Intra-route vehicle-control actions can be determined and executed for various reasons, as referenced, such as to increase passenger comfort (for example, avoiding road bumps or holes), passenger safety (for example, limiting risk of accident), limit likelihood of vehicle injury (increasing vehicle safety), etc.

The vehicle-controls sub-module 336, of the navigation module 330, initiates execution of any special vehicle-controls beyond basic route following, such as moving to an edge of a lane near a certain intersection per pre-determined vehicle-control determination.

Further regarding adaptation of autonomous vehicle controls and communication systems along a route:

Adaptation of vehicle control interfaces/behavior at locations where previous incidents (for example, interventions regarding complexity, crimes regarding safety, etc.) have occurred to lower risk of;

Adaptation could include, for example, going more slowly, which gives vehicle more time to track objects in executing the autonomous driving.

Adaptation could include, for example, slowing down because of a determined high-risk intersection. The action can control how closely the lane tracked because the system knows from historic data (from prior autonomous driving instances, government database, etc.) that cars, bikes, or pedestrians jump out there. Maybe a lane 2 is much safer than lane 1 based on obstruction likelihood—finer route planning/sub-route level A to B is road level/smaller level;

Adaptation could include, for example, avoiding clutter. the system can be configured to, if a lot of data clutter results from sensing a right-side of the road over time at a location (using same or different, though preferably similar, vehicles), move vehicle driving in the lane from about 20 cm from a left-lane edge to 10 cm, could eliminate false detections;

Adaptation could include, for example, modifying longitudinal approach behavior;

Adaptation could include modifying lateral lane offset, for example;

Adaptation could include, for example, executing a maneuver of the automated vehicle to another travel lane; and Adaptation is not limited to driving functions and could include, for example, more slowly or otherwise more gently gathering driver attention in connection with route locations at such locations to avoid or limit surprise of a takeover request—for example, illuminate or otherwise provide an attention signal earlier and possibly more gently.

V.B.x. Output-Communication Module 340

This module 340 is configured in various embodiments to initiate and/or execute any determined communication of data, message, profile updates, the like or other, to destinations within and/or outside of the system.

V.B.xi. Passenger Notification Sub-Module 342

The passenger notification sub-module 342, of the output-communication module 340, initiates or executes communication of notifications to the passenger. The notifications can include any suitable communication provided expressly or inferred by the present disclosure.

Passenger notifications can include, for instance:
a message advising a user of optional routes;
features of optional routes (for example, complexity indexes;
comfort indexes;
a combined—for example, weighted—index;
a recommended route;
a reason that a route is recommended;
a selected route;
a reason that a route is selected;
variables relevant to a route, such as approaching conditions regarding complexity, need to intervene, crime, road conditions;
the like, or other.

As shown, example system output components include vehicle speakers, screens, or other vehicle outputs 70.

Example system output components can also include user devices 34, such as smartphones, wearables, and headphones and remote or cloud systems 50.

V.B.xii. Database-Update Sub-Module 344

Example system output components can also include a vehicle database 104. Output data can be provided by the database-update sub-module 344 to the database 104, directly or via the database sub-module 314. In various implementations data is stored to an appropriate user profile or user account of the ancillary data 112, after any established privacy preservation procedure is properly conducted.

Data stored locally can be sent to, or synchronized with, external systems such as mobile device 34 and remote systems 50. And vice versa—data stored outside of the vehicle can be received at synchronized to the vehicle storage 104.

Example system output components, or sources of data to local system storage, can also include remote systems 50 such as remote servers and user computer systems (for example, home computer). Output can be received and processed at these systems, such as to update a user profile with a determined preference, activity taken regarding the user, the like, or other.

VI. Other Example Algorithm And Process Flows

VI.A. Introduction to the Additional Example Flows

FIGS. 5 and 6 shows algorithms or processes 500, 600, related to the systems described above.

The first process 500 is in various embodiment implemented using a navigation unit that is separate from the vehicle 10, such as a handheld, portable, or internet driving-direction tool or nav unit accessing GPS and other data via the Internet. The first process 500 is not limited to this implementation, though, and may use a vehicle-embedded nav unit.

The second process 600 is in various embodiment implemented using a vehicle-embedded nav unit, but may be implemented by a portable or internet nav unit.

Regarding both processes 500, 600, any of the functions or operations can be performed in one or more or processes, routines, or sub-routines of one or more algorithms, by one or more devices or systems. It should be understood that the steps, operations, or functions of the processes are not necessarily presented in any particular order and that performance of some or all the operations in an alternative order is possible and is contemplated.

The processes 500, 600 can also be combined or overlap, such as one or more operations of one of the processes being performed in the other process. The operations have been presented in the demonstrated order for ease of description and illustration.

Operations can be added, omitted and/or performed simultaneously without departing from the scope of the appended claims. It should also be understood that the illustrated processes can be ended at any time. In certain embodiments, some or all operations of the processes and/or substantially equivalent operations are performed by a computer processor, such as the hardware-based processing unit 106, a processing unit of an user mobile, and/or the unit of a remote device, executing computer-executable instructions stored on a non-transitory computer-readable storage device of the respective device, such as the data storage device 104 of the vehicle system 20, and/or other apparatus such as a remote cloud server 50 or mobile device 34.

VI.B. First Additional Example Flow

The flow 500 of FIG. 5 commences 501 and at block 502 the performing apparatus of the system receives user inputs of route origin location and destination information, such as route start and end addresses.

At block 504, in some implementations, the system receives a user selection of a routing preference, such as shortest distance to destination, shortest time to destination, or best fuel economy. The selection may be made in response to system presentation to the user via a HMI of route characteristics for use by the passenger/driver to make the selection such as respective travels times, distances, or economy of the various routes.

At block 506, the system determines a number n (e.g., n=4) of optional routes according to the prior selection 504.

At block 508, the system determines a best route (b) and in some embodiments one or more closest, alternative routes (a), of the optional routes n, according to pre-established criteria. The alternative routes may be those that are within a pre-established percentage, such as 5%, of the best route based on the variable(s) considered, such as best fuel economy.

At block 510, the system assesses the remaining routes (b, or b+a) in view of any of the elements described expressly or inherently herein, such as the autonomous-driving safety element, complexity element, comfort element, scenery element, and pollution element(s).

At block 512, the system presents route choices (c) to the user for selection. In a contemplated embodiment, the route choices are less than said remaining routes (b, or b+a), as the system removed one or more of the remaining routes based on the assessment using the subject element(s). The presentation can include presenting route characteristics for use by the passenger/driver to determine the preferred route, such autonomous-driving safety index (or value, level, percentage, etc.), complexity index, infrastructure-access index, comfort index, or combination of these, referenced above. Relevant user preferences can also be provided.

At block 514, the system receives user selection of a route to take, or selects a route automatically based on the subject element(s) and any relevant underlying factors, system settings, user preferences, etc.

At block 516, the system initiates execution of the best or most-preferred route using autonomous driving. In some embodiments, the system also initiates intra-route activity beyond just following the route, such as adjusting vehicle perception systems and executing vehicle actions not required to simply follow the route, both as described above.

The process 500 can end 517 or any one or more operations of the process can be performed again.

VI.C. Second Additional Example Flow

The flow 600 of FIG. 6 commences 601 and at block 602, whereat the performing apparatus of the system receives user inputs of route start and destination information, such as route start and end addresses.

At block 604, the system determines top alternative routes (o) according to pre-established criteria. The alternative routes may be those that are within a pre-established percentage, such as 10%, of a best route, or otherwise determined based on variable(s) considered.

In various embodiments, at block 604, only a select one or more primary elements of those described herein are used to narrow the routes, such as autonomous-driving complexity element or comfort element. Primary elements can be default to the system, user set or adjusted via the system or other local or remote device 34, 50, or set or adjusted by the system or instruction from an external apparatus, such as the cloud server 50, for instance.

A number (z) of routes from which these routes o are selected is not limited. The number z may be in the hundreds, or thousands, for instance.

In some implementations, conventional considerations, such as time, distance, and fuel economy are not considered in limiting the routes from all options to a best or preferred route, or such route and top alternatives. In various embodiments, the system is configured so that limiting the routes from all options to a best or preferred route, or such route and top alternatives, includes affording more weight to the elements described—for instance, the autonomous-driving safety and complexity elements can be given more weight than driving distance and economy.

At block 606, the system assesses the select route options o to narrow them further for, or to collect additional information for use in, selecting a best or most-preferred route. The further assessment can be based on one or more elements considered secondary elements of the elements described herein. Secondary elements can be default to the system, user set or adjusted via the system or other local or remote device 34, 50, or set or adjusted by the system or instruction from an external apparatus, such as the cloud server 50, for instance.

Continuing with the example of block 604, if autonomous-driving complexity is a primary element, then at block 606 the secondary element(s) can include any of the autonomous-driving safety element, comfort element, scenery element, and pollution element(s), as examples.

The system may at block 606 narrow the select route options O to top route options t. The top route options t may include a single, best route. Or the system may present the top route options t to the user for selecting the best or more-preferred route. The presentation can include presenting route characteristics for use by the passenger/driver to determine the preferred route, such autonomous-driving safety index (or value, level, percentage, etc.), complexity index, infrastructure-access index, comfort index, or combination of these, referenced above. Relevant user preferences can also be provided.

At block 608, the system initiates execution of the best or most-preferred route using autonomous driving. In some embodiments, the system also initiates intra-route activity beyond just following the route, such as adjusting vehicle perception systems and executing vehicle actions not required to simply follow the route, both as described above.

The process 600 can end 609 or any one or more operations of the process can be performed again.

VII. Select Advantages

Many of the benefits and advantages of the present technology are described above. The present section restates some of those and references some others. The benefits described are not exhaustive of the benefits of the present technology.

The optimized route selection, and in some cases implementation, delivers a very high quality automated-driving experience for passengers in various ways, not limited to comfort, avoiding needed driver manual interventions, autonomous-driving safety, autonomous-vehicle or user-device access to communications infrastructure.

Resulting autonomous-driving quality can equal or exceed that of manually driven vehicles, such as a human-driven taxi.

The technology in operation enhances driver and/or passenger satisfaction, including comfort, with using automated driving by adjusting any of a wide variety of vehicle and/or non-vehicle characteristics, such as vehicle driving-style parameters.

The technology will lead to increased automated-driving system use.

Users are more likely to use or learn about more-advanced autonomous-driving capabilities of the vehicle as well.

A 'relationship' between the user(s) and a subject vehicle can be improved—the user will consider the vehicle as more of a trusted tool, assistant, or friend.

The technology can also affect levels of adoption and, related, affect marketing and sales of autonomous-driving-capable vehicles. As users' trust in autonomous-driving systems increases, they are more likely to purchase an autonomous-driving-capable vehicle, purchase another one, or recommend, or model use of, one to others.

Another benefit of system use is that users will not need to invest effort in setting or calibrating automated driver style parameters, as they are set or adjusted automatically by the system, to minimize user stress and therein increase user satisfaction and comfort with the autonomous-driving vehicle and functionality.

VIII. Conclusion

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

References herein to how a feature is arranged can refer to, but are not limited to, how the feature is positioned with respect to other features. References herein to how a feature is configured can refer to, but are not limited to, how the feature is sized, how the feature is shaped, and/or material of the feature. For simplicity, the term configured can be used to refer to both the configuration and arrangement described above in this paragraph.

Directional references are provided herein mostly for ease of description and for simplified description of the example drawings, and the systems described can be implemented in any of a wide variety of orientations. References herein indicating direction are not made in limiting senses. For example, references to upper, lower, top, bottom, or lateral, are not provided to limit the manner in which the technology of the present disclosure can be implemented. While an upper surface may be referenced, for example, the referenced surface can, but need not be, vertically upward, or atop, in a design, manufacturing, or operating reference frame. The surface can in various embodiments be aside or below other components of the system instead, for instance.

Any component described or shown in the figures as a single item can be replaced by multiple such items configured to perform the functions of the single item described. Likewise, any multiple items can be replaced by a single item configured to perform the functions of the multiple items described.

Variations, modifications, and combinations may be made to the above-described embodiments without departing from the scope of the claims. All such variations, modifications, and combinations are included herein by the scope of this disclosure and the following claims.

What is claimed is:

1. A system comprising:
    a hardware-based processing unit; and
    a non-transitory computer-readable storage medium comprising:
        an input-interface module that, when executed by the hardware-based processing unit, obtains factor data indicating one or more factors relevant to determining a vehicle travel route for an autonomous vehicle; and
        a route-generation module comprising a route-complexity sub-module and a route generation sub-module, wherein the route-complexity sub-module, when executed by the hardware-based processing unit, determines:
            for each of a plurality of routes, based on the factor data, a predicted number of vehicle-to-passenger control interventions along the route, wherein a vehicle-to-passenger control intervention includes transferring control of the autonomous vehicle to a driver; and
            a plurality of route-complexity indexes corresponding to the plurality of routes, wherein the route-complexity indexes are based on the predicted number of vehicle-to-passenger control interventions along a corresponding one of the plurality of routes; and
        the route-generation module, when executed by the hardware-based processing unit, determines the vehicle travel route from one of the plurality of routes based on at least the route-complexity indexes.

2. The system of claim 1 wherein:
    the system is implemented at an autonomous-driving-capable vehicle;
    the system further comprises autonomous-driving apparatus; and
    the storage medium further comprises a route-execution module that, when executed by the hardware-based processing unit, controls the autonomous-driving apparatus to control the autonomous-driving-capable vehicle for executing the vehicle travel route determined.

3. The system of claim 1 wherein:
the system is implemented at an autonomous-driving-capable vehicle;
the route-complexity indexes are autonomous-driving route-complexity indexes;
the vehicle travel route is an autonomous-driving route determined to be executed in autonomous driving of the autonomous-driving-capable vehicle; and
the route-generation module, in determining the vehicle travel route, determines the vehicle travel route based on the autonomous-driving route-complexity indexes.

4. The system of claim 1 wherein the route-complexity sub-module, in determining the route-complexity indexes, determines, for each of the plurality of routes:
an estimated likelihood that one or more vehicle-to-passenger control interventions will be performed in execution of the route based on the factor data; or
an estimated number of interventions that will be performed in execution of the route, based on the factor data.

5. The system of claim 1 wherein:
the route-generation module comprises a route-comfort sub-module;
the route-comfort sub-module, when executed by the hardware-based processing unit, determines, based on the factor data, route-comfort indexes corresponding to respective ones of the plurality of routes; and
the route-generation module, when executed by the hardware-based processing unit, determines the vehicle travel route based on the route-comfort indexes and the route-complexity indexes.

6. The system of claim 5 wherein determining each of the route-comfort indexes is based on a level of comfort, a level of discomfort, and/or a level of human stress level expected in execution of a corresponding route of the plurality of routes.

7. The system of claim 1 wherein:
the route-generation module comprises an autonomous-driving route-safety sub-module;
the autonomous-driving route-safety sub-module, when executed by the hardware-based processing unit, determines, based on the factor data, autonomous-driving route-safety indexes corresponding to respective ones of the plurality of routes; and
the route-generation module, when executed by the hardware-based processing unit, determines the vehicle travel route based on the autonomous-driving route-safety indexes and the route-complexity indexes.

8. The system of claim 7 wherein the autonomous-driving route-safety sub-module, in determining the autonomous-driving route-safety indexes for respective ones of the plurality of routes, determines the autonomous-driving route-safety index based on:
an estimated frequency of safety incidents that occurred in the past on the route;
an estimated number of safety incidents that occurred in the past on execution of the route; or
an estimated severity of safety incidents that occurred in the past on execution of the route.

9. The system of claim 8 wherein:
the system is implemented in an autonomous-driving-capable vehicle;
the vehicle travel route is an autonomous vehicle travel route determined to be executed in autonomous driving of the autonomous-driving-capable vehicle; and at least one of the safety incidents relates to:
a risk of injury or wear and tear to an autonomous-vehicle to execute the autonomous vehicle travel route; or
a risk of injury to a passenger of the autonomous-driving-capable vehicle when the autonomous vehicle travel route is executed by the autonomous-driving-capable vehicle.

10. The system of claim 1 wherein:
the route-generation module comprises a route-pollution sub-module;
the route-pollution sub-module, when executed by the hardware-based processing unit, determines, based on the factor data, one or more route-pollution indexes corresponding to respective ones of the plurality of routes; and
the route-generation module, when executed by the hardware-based processing unit, determines the vehicle travel route based on the route-pollution indexes and the route-complexity indexes.

11. The system of claim 10 wherein a level of pollution of the route-pollution indexes:
relates to sound pollution, air pollution, or noise pollution expected in execution of the route; or
is based on a severity of pollution expected in execution of the route.

12. The system of claim 1 wherein:
the route-generation module comprises a route-infrastructure-accessibility sub-module;
the route-infrastructure-accessibility sub-module, when executed by the hardware-based processing unit, determines, based on the factor data, route-infrastructure-accessibility indexes corresponding to respective ones of the plurality of routes; and
the route-generation module, when executed by the hardware-based processing unit, determines the vehicle travel route based on the route-infrastructure-accessibility indexes and the route-complexity indexes.

13. The system of claim 1 wherein:
the route-generation module comprising a route-scene sub-module;
the route-scene sub-module, when executed by the hardware-based processing unit, determines, based on the factor data, one or more route-scene indexes corresponding to the respective plurality of routes; and
the route-generation module, when executed by the hardware-based processing unit, determines the vehicle travel route based on the route-scene indexes and the route-complexity indexes.

14. The system of claim 1 wherein:
the system is implemented in an autonomous-driving-capable vehicle;
the vehicle travel route is an autonomous vehicle travel route determined to be executed in autonomous driving of the autonomous-driving-capable vehicle; and
the non-transitory computer-readable storage medium further comprises an autonomous-vehicle perception sub-module that, when executed by the hardware-based processing unit, determines an adjustment to make to a perception system of the autonomous-driving-capable vehicle for adjusting perception-system function in execution of the autonomous vehicle travel route determined.

15. The system of claim 1 wherein:
the system is implemented in an autonomous-driving-capable vehicle;

the vehicle travel route is an autonomous vehicle travel route determined to be executed in autonomous driving of the autonomous-driving-capable vehicle; and the non-transitory computer-readable storage medium further comprises an autonomous-driving control sub-module that, when executed by the hardware-based processing unit, determines a modification to make to an autonomous driving system of the autonomous-driving-capable vehicle for modified execution of the vehicle travel route determined, differing from an unmodified manner of executing the autonomous vehicle travel route.

\* \* \* \* \*